(12) United States Patent
Van de Rostyne et al.

(10) Patent No.: US 8,052,500 B2
(45) Date of Patent: Nov. 8, 2011

(54) HELICOPTER WITH MAIN AND AUXILIARY ROTORS

(75) Inventors: Alexander Jozef Magdalena Van de Rostyne, Bornem (BE); Chi Pok Billy Wai, Causeway Bay (HK)

(73) Assignee: Silverlit Limited, Causeway Bay (HK)

( * ) Notice: Subject to any disclaimer, the term of this patent is extended or adjusted under 35 U.S.C. 154(b) by 317 days.

(21) Appl. No.: 12/323,209

(22) Filed: Nov. 25, 2008

(65) Prior Publication Data

US 2010/0130093 A1     May 27, 2010

(51) Int. Cl.
*A63H 27/127* (2006.01)
*B64C 27/00* (2006.01)

(52) U.S. Cl. .................................. 446/36; 244/17.11

(58) Field of Classification Search .............. 446/36–38; 244/17.11, 17.23
See application file for complete search history.

(56) References Cited

U.S. PATENT DOCUMENTS

| | | | |
|---|---|---|---|
| 934,771 A | 9/1909 | Turnbull | |
| 1,403,909 A | 1/1922 | Moir | |
| 1,446,522 A | 2/1923 | Smith | |
| 1,470,017 A | 10/1923 | Lougheed | |
| 1,773,281 A | 8/1930 | Scott | |
| 1,800,470 A * | 4/1931 | Oehmichen | 416/40 |
| 1,925,156 A | 9/1933 | Vaughn | |
| 2,030,578 A | 2/1936 | Flettner | |
| 2,110,563 A | 3/1938 | Thaon | |
| 2,272,643 A | 2/1942 | Peters et al. | |
| 2,307,381 A | 1/1943 | Bess | |
| 2,368,698 A | 2/1945 | Young | |
| 2,384,516 A | 9/1945 | Young | |
| 2,411,596 A | 11/1946 | Shapiro | |
| 2,413,831 A | 1/1947 | Jordan | |
| 2,429,502 A | 10/1947 | Young | |
| D149,130 S | 3/1948 | Katenberter et al. | |
| 2,439,143 A | 4/1948 | Nemeth | |
| D153,314 S | 4/1949 | Piasecki | |
| D153,315 S | 4/1949 | Piasecki | |
| D153,316 S | 4/1949 | Piasecki | |
| D153,317 S | 4/1949 | Piasecki | |
| 2,469,144 A | 5/1949 | Baggott | |

(Continued)

FOREIGN PATENT DOCUMENTS

BE      338599      12/1926

(Continued)

OTHER PUBLICATIONS

U.S. Appl. No. 29/282,581, filed Jul. 24, 2007, Van de Rostyne et al.

(Continued)

*Primary Examiner* — Gene Kim
*Assistant Examiner* — Alyssa Hylinski
(74) *Attorney, Agent, or Firm* — Greenberg Traurig, LLP

(57) ABSTRACT

A remote control toy helicopter has a main rotor and an auxiliary rotor both driven by a rotor shaft. The auxiliary rotor has elongated elements at an acute angle relative to blades of the main rotor. A control system is provided that includes an actuator for engaging with a control assembly depending from the auxiliary rotor. The inter-engagement of the actuator and the control assembly effects change in the angle of incidence of the elongated elements of the auxiliary rotor. The interaction occurs when the assembly engages with the actuator by a depending arm associated with the assembly.

35 Claims, 27 Drawing Sheets

U.S. PATENT DOCUMENTS

| | | | |
|---|---|---|---|
| 2,481,750 A | 9/1949 | Hiller, Jr. et al. | |
| 2,486,059 A | 10/1949 | Pentecost | |
| 2,487,020 A | 11/1949 | Gilcrease | |
| 2,514,822 A | 7/1950 | Wolfe, Jr. | |
| 2,532,683 A | 12/1950 | Traver | |
| 2,554,938 A | 5/1951 | Catalano | |
| D163,938 S | 7/1951 | Douglas | |
| 2,563,731 A | 8/1951 | Masterson | |
| 2,629,568 A | 2/1953 | Croshere, Jr. et al. | |
| 2,629,570 A | 2/1953 | Carnahan | |
| 2,633,924 A | 4/1953 | Young | |
| 2,639,874 A | 5/1953 | Stalker | |
| 2,646,848 A | 7/1953 | Young | |
| D171,569 S | 3/1954 | Apostolescu | |
| 2,725,494 A | 11/1955 | Anderson | |
| D178,081 S | 6/1956 | Papadakos | |
| 2,750,131 A | 6/1956 | Thomson | |
| D181,643 S | 12/1957 | Graham | |
| D184,501 S | 2/1959 | Wlaschin et al. | |
| 2,923,494 A | 2/1960 | Strong | |
| D187,625 S | 4/1960 | Apostolescu | |
| D187,895 S | 5/1960 | Douglas | |
| 2,950,074 A | 8/1960 | Apostolescu | |
| 2,980,187 A * | 4/1961 | Smyth-Davila | 416/18 |
| 3,029,048 A | 4/1962 | Brooks et al. | |
| 3,035,643 A | 5/1962 | Kelley et al. | |
| 3,068,611 A | 12/1962 | Lauderdale | |
| 3,080,001 A * | 3/1963 | Culver et al. | 416/18 |
| 3,093,929 A | 6/1963 | Robbins et al. | |
| 3,106,964 A | 10/1963 | Culver et al. | |
| 3,116,896 A | 1/1964 | Sigler et al. | |
| 3,135,334 A | 6/1964 | Culver | |
| 3,180,424 A | 4/1965 | Serriades | |
| 3,213,944 A | 10/1965 | Nichols et al. | |
| 3,228,478 A | 1/1966 | Edenborough | |
| 3,231,222 A * | 1/1966 | Scheutzow | 244/17.19 |
| D205,326 S | 7/1966 | Postelson-Apostolescu | |
| 3,370,809 A | 2/1968 | Leoni | |
| 3,371,886 A | 3/1968 | Schertz | |
| 3,391,746 A | 7/1968 | Cardoso | |
| 3,409,249 A | 11/1968 | Bergquist et al. | |
| 3,448,810 A | 6/1969 | Vogt | |
| 3,450,374 A | 6/1969 | Moore | |
| 3,481,559 A | 12/1969 | Apostolescu | |
| 3,572,616 A | 3/1971 | Ulisnik | |
| 3,592,559 A | 7/1971 | Ward | |
| D221,453 S | 8/1971 | Swanberg | |
| 3,625,631 A | 12/1971 | Covington, Jr. et al. | |
| 3,662,487 A | 5/1972 | Seefluth | |
| 3,759,629 A | 9/1973 | Abramopaulos | |
| 3,771,924 A | 11/1973 | Buchstaller | |
| D232,168 S | 7/1974 | Leoni | |
| D232,170 S | 7/1974 | Diamond et al. | |
| D234,350 S | 2/1975 | Beckert et al. | |
| 3,933,324 A | 1/1976 | Ostrowski | |
| D239,930 S | 5/1976 | Ulisnik | |
| 4,025,230 A | 5/1977 | Kastan | |
| 4,053,123 A | 10/1977 | Chadwick | |
| 4,073,086 A | 2/1978 | Ogawa | |
| 4,084,345 A | 4/1978 | Tanaka | |
| 4,118,143 A * | 10/1978 | Kavan | 416/18 |
| 4,142,697 A | 3/1979 | Fradenburgh | |
| D253,003 S | 9/1979 | Tanaka | |
| 4,173,321 A | 11/1979 | Eickmann | |
| 4,227,856 A | 10/1980 | Verrill et al. | |
| 4,307,533 A | 12/1981 | Sims et al. | |
| 4,519,746 A | 5/1985 | Wainauski et al. | |
| 4,522,563 A | 6/1985 | Reyes et al. | |
| 4,629,440 A | 12/1986 | McKittrick et al. | |
| D287,738 S | 1/1987 | Bollinger et al. | |
| D294,605 S | 3/1988 | Matsumoto | |
| 4,759,514 A * | 7/1988 | Burkam | 244/17.21 |
| 4,880,355 A | 11/1989 | Viullet et al. | |
| 4,941,803 A | 7/1990 | Wainauski et al. | |
| 4,981,456 A | 1/1991 | Sato et al. | |
| 5,015,187 A | 5/1991 | Lord | |
| 5,108,043 A | 4/1992 | Canavespe | |
| 5,151,014 A | 9/1992 | Greenwald et al. | |
| 5,190,242 A | 3/1993 | Nichols | |
| 5,203,520 A | 4/1993 | Przygodzki et al. | |
| 5,209,429 A | 5/1993 | Doolin et al. | |
| 5,240,204 A | 8/1993 | Kunz | |
| 5,252,100 A | 10/1993 | Osawa et al. | |
| 5,255,871 A * | 10/1993 | Ikeda | 244/17.13 |
| 5,259,729 A | 11/1993 | Fujihira et al. | |
| 5,304,090 A | 4/1994 | Vanni | |
| 5,370,341 A | 12/1994 | Leon | |
| D357,894 S | 5/1995 | Arnold et al. | |
| 5,505,407 A | 4/1996 | Chiappetta | |
| 5,511,947 A | 4/1996 | Schmuck | |
| D372,741 S | 8/1996 | Tsai | |
| D378,606 S | 3/1997 | Tamagnini | |
| 5,609,312 A * | 3/1997 | Arlton et al. | 244/17.11 |
| 5,628,620 A * | 5/1997 | Arlton | 416/114 |
| D388,048 S | 12/1997 | Taylor et al. | |
| D390,942 S | 2/1998 | Mei | |
| 5,749,540 A | 5/1998 | Arlton | |
| 5,836,545 A | 11/1998 | Arlton et al. | |
| 5,879,131 A | 3/1999 | Arlton et al. | |
| 5,906,476 A * | 5/1999 | Arlton | 416/114 |
| 5,915,649 A | 6/1999 | Head | |
| 6,000,911 A | 12/1999 | Toulmay et al. | |
| D421,279 S | 2/2000 | Tsai | |
| 6,032,899 A | 3/2000 | Mondet et al. | |
| 6,039,541 A | 3/2000 | Parker et al. | |
| D425,853 S | 5/2000 | Caporaletti | |
| 6,086,016 A | 7/2000 | Meek | |
| 6,302,652 B1 | 10/2001 | Roberts | |
| 6,398,618 B1 | 6/2002 | Wu | |
| 6,435,453 B1 | 8/2002 | Carter, Jr. | |
| 6,460,802 B1 | 10/2002 | Norris | |
| 6,467,726 B1 | 10/2002 | Hosoda | |
| D467,861 S | 12/2002 | Lee | |
| 6,499,690 B1 | 12/2002 | Katayama et al. | |
| 6,543,726 B2 | 4/2003 | Illingworth | |
| 6,632,119 B2 | 10/2003 | Chernek et al. | |
| 6,659,395 B2 | 12/2003 | Rehkemper et al. | |
| 6,659,721 B1 | 12/2003 | Parker et al. | |
| 6,702,552 B1 | 3/2004 | Harman | |
| 6,719,244 B1 | 4/2004 | Gress | |
| 6,732,973 B1 | 5/2004 | Rehkemper | |
| 6,745,977 B1 | 6/2004 | Long et al. | |
| 6,749,401 B2 | 6/2004 | Vanmoor | |
| 6,758,436 B2 | 7/2004 | Rehkemper et al. | |
| 6,789,764 B2 | 9/2004 | Bass et al. | |
| 6,884,034 B1 | 4/2005 | Parker et al. | |
| 6,886,777 B2 | 5/2005 | Rock | |
| 6,899,586 B2 | 5/2005 | Davis | |
| 6,929,215 B2 | 8/2005 | Arlton | |
| 6,960,112 B2 | 11/2005 | Helmlinger et al. | |
| 6,978,969 B1 | 12/2005 | Neal | |
| D524,227 S | 7/2006 | Stille et al. | |
| D524,228 S | 7/2006 | Scott et al. | |
| D524,229 S | 7/2006 | Stille et al. | |
| D524,230 S | 7/2006 | Stille et al. | |
| D524,718 S | 7/2006 | Scott et al. | |
| 7,100,866 B2 | 9/2006 | Rehkemper et al. | |
| 7,178,757 B1 | 2/2007 | Breese et al. | |
| 7,178,758 B2 | 2/2007 | Rehkemper | |
| 7,188,803 B2 | 3/2007 | Ishiba | |
| 7,198,223 B2 | 4/2007 | Phelps, III et al. | |
| 7,204,453 B2 | 4/2007 | Muren | |
| D544,825 S | 6/2007 | Van de Rostyne et al. | |
| D545,755 S | 7/2007 | Van de Rostyne et al. | |
| D546,269 S | 7/2007 | Van de Rostyne et al. | |
| 7,246,769 B2 | 7/2007 | Yoeli | |
| D548,803 S | 8/2007 | Zimet | |
| 7,264,199 B2 | 9/2007 | Zientek | |
| 7,273,195 B1 | 9/2007 | Golliher | |
| D552,531 S | 10/2007 | Van de Rostyne et al. | |
| D554,040 S | 10/2007 | Van de Rostyne et al. | |
| 7,306,186 B2 | 12/2007 | Kusic | |
| D559,764 S | 1/2008 | Wai | |
| D561,084 S | 2/2008 | Wai | |
| D561,679 S | 2/2008 | Wai | |
| 2002/0008759 A1 | 1/2002 | Hoyos | |
| 2002/0049518 A1* | 4/2002 | Yamamoto | 701/2 |

| | | | |
|---|---|---|---|
| 2002/0109044 | A1 | 8/2002 | Rock |
| 2002/0134883 | A1 | 9/2002 | Stamps et al. |
| 2004/0087241 | A1 | 5/2004 | Agostini et al. |
| 2004/0184915 | A1* | 9/2004 | Kunii et al. ............ 416/114 |
| 2004/0222329 | A1 | 11/2004 | Kuhns et al. |
| 2004/0245376 | A1 | 12/2004 | Muren |
| 2005/0121552 | A1 | 6/2005 | Rehkemper |
| 2005/0121553 | A1 | 6/2005 | Isawa et al. |
| 2006/0102777 | A1 | 5/2006 | Rock |
| 2006/0121819 | A1 | 6/2006 | Isawa |
| 2006/0231677 | A1 | 10/2006 | Zimet et al. |
| 2007/0012818 | A1 | 1/2007 | Miyazawa et al. |
| 2007/0017724 | A1 | 1/2007 | Rajasingham |
| 2007/0105475 | A1 | 5/2007 | Gotou et al. |
| 2007/0164148 | A1 | 7/2007 | Van De Rostyne |
| 2007/0164149 | A1 | 7/2007 | Van de Rostyne |
| 2007/0164150 | A1 | 7/2007 | Van de Rostyne |
| 2007/0178798 | A1 | 8/2007 | Lai |
| 2007/0181742 | A1 | 8/2007 | Van de Rostyne et al. |
| 2007/0187549 | A1 | 8/2007 | Owen |
| 2007/0215750 | A1 | 9/2007 | Shantz et al. |
| 2007/0221781 | A1 | 9/2007 | Van de Rostyne |
| 2007/0262197 | A1 | 11/2007 | Phelps et al. |
| 2007/0272794 | A1 | 11/2007 | Van de Rostyne |
| 2008/0067284 | A1 | 3/2008 | Bakker |
| 2008/0076319 | A1 | 3/2008 | Van De Rostyne |
| 2008/0076320 | A1 | 3/2008 | Van De Rostyne |
| 2008/0085653 | A1 | 4/2008 | Van De Rostyne |
| 2008/0111399 | A1 | 5/2008 | Zierten |
| 2008/0112808 | A1 | 5/2008 | Schmaling et al. |
| 2008/0207079 | A1 | 8/2008 | Corsiglia et al. |

FOREIGN PATENT DOCUMENTS

| | | | |
|---|---|---|---|
| BE | 1016960 | | 11/2007 |
| DE | 1 270 408 | | 6/1968 |
| DE | 40 17 402 | A1 | 12/1991 |
| DE | 94 14 652 | U1 | 11/1994 |
| DE | 203 14 041 | U1 | 4/2004 |
| EP | 0 250 135 | | 12/1987 |
| EP | 0 727 350 | | 8/1996 |
| EP | 1462362 | A1 | 9/2004 |
| ES | P0233821 | | 8/1957 |
| ES | P0234258 | | 9/1957 |
| ES | P0245313 | | 4/1959 |
| ES | P0283794 | | 1/1963 |
| ES | 490715 | | 4/1980 |
| ES | 275141 | | 7/1982 |
| ES | 0298826 | | 1/1989 |
| ES | 0464158 | | 1/1992 |
| ES | 2 074 010 | | 8/1995 |
| ES | 0727350 | | 8/1996 |
| ES | 1238185 | | 9/2002 |
| ES | 2172362 | | 9/2002 |
| ES | 2251668 | | 9/2004 |
| GB | 255 936 | | 7/1926 |
| GB | 272871 | | 5/1927 |
| GB | 281721 | | 8/1928 |
| GB | 916894 | A | 1/1963 |
| GB | 956536 | | 4/1964 |
| GB | 958536 | | 5/1964 |
| GB | 1081341 | A | 8/1967 |
| GB | 2 436 258 | A | 9/2007 |
| JP | S30-7668 | | 10/1930 |
| JP | S32-003535 | | 6/1932 |
| JP | 1269699 | | 10/1989 |
| JP | 5192452 | | 8/1993 |
| JP | 8150818 | | 6/1996 |
| JP | 9512515 | | 12/1997 |
| JP | 10076996 | | 3/1998 |
| JP | 2000-272594 | | 10/2000 |
| JP | 2003-103066 | | 4/2003 |
| JP | 2003-220999 | | 8/2003 |
| JP | 2004-121798 | | 4/2004 |
| JP | 2005-193905 | | 7/2005 |
| JP | 2006-051217 | | 2/2006 |
| WO | WO03/080433 | A1 | 10/2003 |
| WO | WO2006/075096 | | 7/2006 |

OTHER PUBLICATIONS

U.S. Appl. No. 29/283,934, filed Aug. 27, 2007, Van de Rostyne et al.
U.S. Appl. No. 29/297,478, filed Nov. 12, 2007, Van de Rostyne et al.
U.S. Appl. No. 29/297,479, filed Nov. 12, 2007, Van de Rostyne et al.
U.S. Appl. No. 29/297,765, filed Nov. 16, 2007, Van de Rostyne et al.
U.S. Appl. No. 29/302,018, filed Jan. 8, 2008, Van de Rostyne et al.
U.S. Appl. No. 29/302,020, filed Jan. 8, 2008, Van de Rostyne et al.
Photographic prior art reference #1, helicopter.
Photographic prior art reference #2, helicopter displaying writing in French on the tail.
Photographic prior art reference #3, explanation of the function of the flybar.
Photographic prior art reference #4, toy helicopter, www.raidentech. com.
Photographic prior art reference #5, toy helicopter.
Photographic prior art reference #6, helicopter.
Photographic prior art reference #7, helicopter with M40297 or MA0297 displayed on the tail.
Photographic prior art reference #8, toy helicopter #AHS-23900, hstoy.en.alibaba.com.
Photographic prior art reference #9, toy helicopter, toys999.en. alibaba.com.
Mill, Colin. "Practical Theories, Part 9", W3MH—World Wide Web *Model Helicopter Magazine*, Jul. 1996, http://www.w3mh.co.uk/articles/html/csm9-11.htm.
Day, David. "Moving swashplates & CCPM", 2001-2006. See http://www.iroquois.free-online.co.uk.
Selberg, B.P.; Cronin, D.L.; Rokhsaz, K.; Dykman, J.R., Yager, C. J. "Aerodynamic-Structural Analysis of Dual Bladed Helicopter Systems (Field Technical Report", Report No. NASA-CR-162754, Feb 80 46p (Abstract).
Ham, Normand. Helicopter individual-blade-control research at MIT 1977-1985; DGLR, European Rotorcraft Forum, 12th, Garmisch-Partenkirchen, West Germany; Germany, Federal Republic of; Sep. 22-25, 1986 10 pp. 1986 (Abstract).
Proctor, Paul. "Aviation Week & Space Technology", v146, n13, p47(1), Mar. 31, 1997 (Abstract).
Zein-Sabatto, S.; Zheng, Y. "Intelligent Flight Controllers for Helicopter Control"; 1997 IEEE International Conference on Neural Networks, Proceedings (Cat. No. 97CH36109) Part vol. 2 p. 617-21 vol. 2 (Abstract).
Mirick, Paul H. "A Comparison of Theory and Experiment for Coupled Rotor Body Stability of a Bearingless Rotor Model in Hover and Forward Flight", Jun. 1, 1988, IP Document Id 19880017770 pp. 87-101 (Abstract).
US District Court, Eastern District of Virginia, Norfolk Division, *Silverlit Toys Manufactory, Ltd., et al.* v. *Westminster, Inc., et al.*, Case No. 2:07-cv-472-JBF/JEB.
US District Court, Northern District of Georgia, Atlanta Division, *Westminster, Inc.* v. *Silverlit Toys Manufactory, Ltd., et al.*, Case No. 1:07-cv-2450-JOF.
US District Court, Central District of California, Southern Division, *Innovage LLC* v. *Silverlit Toys Manufactory, Ltd., et al.*, Case No. SACV07-1334 DOC (ANx).
"Declaration of Alexander Van De Rostyne in Support of Defendants and Counterclaimants Silverlit Toys Manufactory Ltd.'s and Spin Master Ltd.'s Motion for Preliminary Injunction", with relevant Exhibits A, C and E-Q, filed on Dec. 3, 2007, in USDC Case No. SACV07-1334 DOC (ANx).
"Declaration of Kei Fung ("Kevin") Choi in Support of Defendants and Counterclaimants' Motion for Preliminary Injunction", with relevant Exhibits A, C, and E, filed on Dec. 3, 2007, in USDC Case No. SACV07-1334 DOC (ANx).
"Declaration of L. Kenneth Rosenthal in Support of Counterclaimants Silverlit Toys Manufactory Ltd.'s and Spin Master Ltd.'s Motion for Preliminary Injunction", with relevant Exhibits O, P, S, V, Y, BB, MM and NN, filed on Dec. 3, 2007, in USDC Case No. SACV07-1334 DOC (ANx).
"Memorandum of Points and Authorities in Support of Motion for Preliminary Injunction of Silverlit Manufactory Ltd. and Spin Master Ltd.", filed on Dec. 3, 2007, in USDC Case No. SACV07-1334 DOC (ANx).
"Declaration of Valerie W. Ho in Support of Defendants and Counterclaimants' Motion for Preliminary Injunction", with relevant Exhibits A, B and M, filed on Dec. 3, 2007, in USDC Case No. SACV07-1334 DOC (ANx).
"Declaration of Conor Forkan in Support of Counterclaimants Silverlit Toys Manufactory Ltd.'s and Spin Master Ltd.'s Reply to Innovage's Opposition to Motion for Preliminary Injunction", with relevant Exhibits A-D, filed on Dec. 26, 2007, in USDC Case No. SACV07-1334 DOC (ANx).
"Declaration of L. Kenneth Rosenthal in Support of Counterclaimants Silverlit Toys Manufactory Ltd.'s and Spin Master Ltd.'s Reply to Innovage's Opposition to Motion for Preliminary Injunction", with relevant Exhibits A-D, filed on Dec. 26, 2007, in USDC Case No. SACV07-1334 DOC (ANx).
"Counterclaimants Silverlit Toys Manufactory Ltd.'s and Spin Master Ltd.'s Reply in Support of Motion for Preliminary Injunction", filed on Dec. 26, 2007, in USDC Case No. SACV07-1334 DOC (ANx).
"Innovage's Memorandum of Points and Authorities in Opposition to Silverlit and Spin Master's Motion for Preliminary Injunction", filed on Dec. 19, 2007, in USDC Case No. SACV07-1334 DOC (ANx).
"Declaration of Francisco Rubio-Campos in Support of Plaintiff Innovage LLC's Opposition to Silverlit and Spin Master's Motion for Preliminary Injunction", filed on Dec. 19, 2007, in USDC Case No. SACV07-1334 DOC (ANx).
"Declaration of Jennifer Hamilton in Support of Plaintiff Innovage LLC's Opposition to Silverlit and Spin Master's Motion for Preliminary Injunction", filed on Dec. 19, 2007, in USDC Case No. SACV07-1334 DOC (ANx).
"Counterclaim Defendant Merchsource's Opposition to Preliminary Injunction", filed on Dec. 19, 2007, in USDC Case No. SACV07-1334 DOC (ANx).
"Declaration of Lowell Anderson in Opposition to Preliminary Injunction", filed on Dec. 19, 2007, in USDC Case No. SACV07-1334 DOC (ANx).
"Supplemental Declaration of Francisco Rubio-Campos in Support of Plaintiff Innovage LLLC's Opposition to silverlit and Spin Master's Motion for Preliminary Injunction", filed on Jan. 4, 2008, in USDC Case No. SAC07-1334 DOC (ANx).
"Declaration of Nicholas Ringold in Support of Defendants and Counterclaimants' Reply to Merchsource LLC's Opposition to Ex Parte Application to Shorten Time for Hearing on Preliminary Injunction", with relevant Exhibits B-I, filed on Dec. 5, 2007, in USDC Case No. SACV07-1334 DOC (ANx).
"Declaration of Kei Fung ("Kevin") Choi in Support of Defendant and Counterclaimants' Reply to Merchsource LLC's Opposition to Ex Parte Application to Shorten Time for Hearing on Preliminary Injunction", Exhibit A filed on Dec. 6, 2007, in USDC Case No. SACV07-1334 DOC (ANx).
"Counterclaimants Silverlit Toys Manufactory Ltd.'s and Spin Master's Reply to Merchsource LLC's Opposition to Ex Parte Application to Shorten Time on Hearing on Motion for Preliminary Injunction", filed Dec. 6, 2007, in USDC Case No. SACV07-1334 DOC (ANx).
"Counterclaimants Silverlit Toys Manufactory Ltd.'s and Spin Master's 1) Reply to Innovage LLC's Opposition to Ex Parte Application to Shorten Time on Hearing on Motion for Preliminary Injunction, and 2) Opposition to Innovage LLC's Ex Parte Application for Order to Extend Time to Oppose Motion for Preliminary Injunction", filed on Dec. 5, 2007, in USDC Case No. SACV07-1334 DOC (ANx).
"Declaration of Lowell Anderson in Opposition to Ex Parte Application to Shorten Time for Hearing on Preliminary Injunction", filed on Dec. 4, 2007, in USDC Case No. SACV07-1334 DOC (ANx).
"Counterclaim Defendant Merchsource's Opposition to Ex Parte Application to Shorten Time for Hearing on Motion for Preliminary Injunction", filed on Dec. 4, 2007, in USDC Case No. SACV07-1334 DOC (ANx).
"Plaintiff Innovage LLC's Opposition to Defendant Silverlit and Spin Master's Ex Parte Application for Order to Shorten Time for Hearing on Defendants' Motion for Preliminary Injunction; Declaration of Barry Messner in Support", filed on Dec. 4, 2007, in USDC Case No. SACV07-1334 DOC (ANx).
"Plaintiff Innovage LLC's Ex Parte Application for Order to Extend Time to Oppose Defendants'Motion for Preliminary Injunction; Memorandum of Points and Authorities; Declaration of Barry Messner", filed on Dec. 4, 2007, in USDC Case No. SACV07-1334 DOC (ANx).
"Amended Answer, Affirmative Defenses and Counterclaims for: (1) Patent Infringement; (2) Trade Dress Infringement; (3) Unfair Competition and False Designation of Origin; (4) Unfair Competition Under California Business & Profession Code § 17200; and (5) Copyright Infringement", filed on Dec. 11, 2007, in USDC Case No. SACV07-1334 DOC (ANx).
"Innovage's Reply in Opposition of Silverlit and Spin Master to Plaintiff Innovage LLC's Ex Parte Application for Order to Extend Time to Oppose Defendants' Motion for Preliminary Injunction", filed on Dec. 7, 2007, in USDC Case No. SACV07-1334 DOCc (ANx).
"Counterclaim Defendant Innovage LLC's Amended Reply and Affirmative Defenses to Counterclaims of Silverlit Toys Manufactory Ltd. and Spin Master Ltd.", filed on Jan. 9, 2008, in USDC Case No. SACV07-1334 DOC (ANx).
"*ORDER* Denying Defendants' Motion for Preliminary Injunction", filed on Jan. 8, 2008, in USDC Case No. SACV07-1334 DOC (ANx).
"Counterclaimants Silverlit Toys Manufactory Ltd.'s and Spin Master's Ltd.'s Objection and Motion to Strike Plaintiff Innovage LLC's Belated Supplemental Declaration of Francisco Rubio-Campos", filed on Jan. 4, 2008, in USDC Case No. SACV07-1334 DOC (ANx).
"Supplemental Declaration of Francisco Rubio-Campos in Support of Plaintiff Innovage LLC's.Opposition to Silverlit ad Spin Master's Motion for Preliminary Injunction", filed on Jan. 4, 2008, in USDC Case No. SACV07-1334 DOC (ANx).
"Counterclaim Defendant Innovage LLC's Reply and Affirmative Defenses to Counterclaims of Silverlit Toys Manufactory Ltd. and Spin Master Ltd.", filed on Dec. 26, 2007, in USDC Case No. SACV07-1334 DOC (ANx).
"Counterclaim Defendant Merchsource LLC's Answer and Defenses to Counterclaims of Silverlit Toys Manufactory Ltd. and Spin Master Ltd.", filed on Dec. 26, 2007, in USDC Case No. SACV07-1334 DOC (ANx).
"Answer, Affirmative Defenses and Counterclaims for: (1) Patent Infringement; (2) Trade Dress Infringement; (3) Unfair Competition and False Designation of Origin; and (4) Unfair Competition Under California Business & Professions Code § 17200", with Exhibits E & F, filed on Dec. 3, 2007, in USDC Case No. SACV07-1334 DOC (ANx).
"Complaint for: 1) Declaratory Judgment of Invalidity and Non-Infringement of Certain Design.Patents; 2) Declaratory Judgment of Invalidity and Non-Infringement of Trade Dress", filed on Nov. 13, 2007, in USDC Case No. SACV07-1334 DOC (ANx).
Photo of portion of PicooZ product package; Silverlit 2006 Product Catalog (5 pages total).
Partial International Search from PCT/US2006/047982.
Photographic prior art reference, Dragonfly helicopter (2005) (4 pages).
*Piccolino: 1.69 gram RC helicopter—RCGroups.com*, http://www.rcgroups.com/forums/showthread.php?t=509295, Apr. 24, 2006 (6 pages).
International Search from PCT/US2008/051938.
Pryun, Richard R. "In-flight measurement of rotor blade airloads, bending moments, and motions, together with rotor shaft loads and fuselage vibration, on a tandem rotor helicopter", *Boeing*, Nov. 1967 (Abstract, 1 pg).
Brahmananda, et al. "Application of passive dampers to modern helicopters", Smart Mater, 1996 http://www.iop.org/Ej/abstract/0964-1726/5/5/001 (Abstract, 1 pg).
http://www.microhelicopters.net, Jul. 7, 2008 (3 pgs).
Castillo, et al. "Real-time stabilization and tracking of a four-rotor mini rotorcraft", IEEE, Jul. 2004 http://www.ieeexplore.org/xpl/freeabs_all.jsp?arnumber=1308180 (1 pg).
"Structural Components, Design of Tilt-Rotor JVX Near Completion", Aviation Week & Space Technology, vol. 122, No. 2, p. 84, Jan. 14, 1985 (10 pgs).
European Search Opinion dated Jun. 10, 2008, in EP 06 845 583.1.
Website reference, en.wikipedia.org/wiki/Kamov_Ka-50, Kamov Ka-50, Jun. 19, 2004 (6 pages).

Photographic reference, en.wikipedia.org/wiki/Image:Kamov_Ka-50_MAKS-2005.jpg, Aug. 28, 1995.
Photographic reference, www.fas.org/man/dod-101/sys/ac/row/ka-50-hokum.jpg, Aug. 28, 1995.
Photographic reference, www.aviastar.ord/foto/ka-50_1.jpg, Aug. 28, 1995.
Website reference, web.archive.org/web/20050225044931/http://www.silverlit.com (2 pages), Jun. 5, 2007.
Website reference, web.archive.org/web/20060616140712/boeing.com/rotorcraft/military/ah64d/index.htm, Nov. 23, 2001 (2 pages).
Website reference, en.wikipedia.org/wiki/AH-64_Apache, Jul. 16, 2004 (11 pages).
Website reference, http://www.globalsecurity.org/military/systems/aircraft/ah-64d.htm, Nov. 7, 2001 (6 pages).
Photographic reference, www.fas.org/man/dod-101/sys/ac/ah-64.gif, Aug. 19, 2000.
Photographic reference, en.wikipedia.ord/wiki/Image:P320007.jpg, 1981 (3 pages).
Photographic reference, www.fas.org/man/dod-101/sys/ac/ah-64d_001.jpg, Mar. 21, 1997.
Photographic reference, www.fas.org./man/dod-101/sys/ac/ah-64d-image83.jpg, Aug. 19, 2000.
Photographic reference, www.fas.org./man/dod-101/sys/ac/ah-64d-longbowl.jpg, Aug. 19, 2000.
Photographic reference, www.fas.org/man/dod-101/sys/ac/ah-64-dvic294.jpg, Feb. 2, 2003.
Photographic reference, www.voodoo.cz/ah64/pics/ah115.jpg, Jun. 14, 2001.
Photographic reference, www.voodoo.cz/ah64/pics/ah122.jpg, Jan. 10, 2002.
Photographic reference, www.voodoo.cz/ah64/pics/ah106.jpg, Jan. 9, 2002.
Photographic reference, www.voodoo.cz/ah64/pics/ah112.jpg, Aug. 22, 2002.
Photographic reference, www.voodoo.cz/ah64/pics/ah092.jpg, Jan. 8, 2002.
Photographic reference, www.voodoo.cz/ah64/pics/ah153.jpg, Apr. 4, 2002.
Photographic reference, www.voodoo.cz/ah64/pics/ah149.jpg, Jul. 8, 2000.
Photographic reference, www.voodoo.cz/ah64/pics/ah051.jpg, Jan. 8, 2002.
Photographic reference, www.voodoo.cz/ah64/pics/ah049.jpg, Mar. 15, 2002.
Photographic reference, www.voodoo.cz/ah64/pics/ah027.jpg, May 8, 1999.
Photographic reference, www.voodoo.cz/ah64/pics/ah010.jpg, Jul. 8, 2000.
Photographic reference, www.voodoo.cz/ah64/pics/ah003.jpg, Sep. 1, 2001.
Photographic reference, www.airforceworld.com/heli/gfx/ah64/wah64 1.jpg, 1991.
Photographic reference, www.fas.org/man/dod-101/sys/ac/ah-64a-990421-F-2095R-004.jpg, Aug. 19, 2000.
Photographic reference, www.fas.org/man/dod-101/sys/ac/ah-64-dvic292.jpg, Aug. 19, 2000.
Website reference, www.runryder.com/helicopter/t285494p1/, Jun. 12, 2007 (10 pages).
Website reference, web.archive.org/web/20031218200732/http://www.scarlet.be/pixel/pixeli111.htm, Dec. 18, 2003 (7 pages).
Website reference, web.archive.org/web/20031017234927/http://www.scarlet.be/pixel/ pixelfp.htm, Oct. 17, 2003 (2 pages).
Website reference, web.archive.org/web/20031218061901/http://pixelito.reference.be/, Dec. 18, 2003 (4 pages).
Website reference, www.aviastar.org/helicopters_eng/breguet-dorand.php, 1935 (4 pages).
Website reference, www.lionheartcreations.com/Lionheartsflightsimsite_page7.html, May 6, 2004 (4 pages).
Website reference, www.lionheartcreations.com/FalconE.html, Jun. 22, 2004 (2 pages).
Photographic reference, www.rotaryaction.com/images/airwolf4.jpg, 1984.
Website reference, www.rotaryaction.com/pages/airwolf.html, 1984 (3 pages).
Website reference, http://www.youtube.com/watch?v=DsXgmOurwts, "Golden Age Pioneers—Nicolas Florine", Mar. 28, 2008 (4 pages).
Robert Dingemanse, Press Release "Flying Car Company Takes Off", Mar. 2007, http://www.pal-v.com.
"Esky Dauphin 4-channels Mini Electric Coaxial Helicopter", http://www.esky-heli.com/esky-24g-4ch-dauphin-bluegrey-rtf-kit-for-beginner-flightsim-p-2994.html, May 8, 2008.

* cited by examiner

HELICOPTER WITH MAIN AND AUXILIARY ROTORS

RELATED APPLICATION

This application is related to U.S. patent application Ser. No. 11/627,919 filed Jan. 26, 2007, U.S. patent application Ser. No. 11/465,781, Aug. 18, 2006, which is a continuation-in-part of U.S. patent application Ser. No. 11/462,177, filed Aug. 3, 2006, which claims priority to Belgian Patent Application No. 2006/0043 entitled Autostabiele helicopter by Alexander VAN DE ROSTYNE, which was filed on Jan. 19, 2006. The contents of these applications are incorporated by reference herein.

BACKGROUND

The present disclosure concerns an improved flying object such as a helicopter.

The disclosure concerns a helicopter generally. In particular, but not exclusively, it is related to a toy helicopter and in particular to a re mote-controlled model helicopter or a toy helicopter.

It is known that a helicopter is a complex machine which is unstable and as a result difficult to control, so that much experience is required to safely operate such helicopters without mishaps.

Typically, a helicopter includes a body, a main rotor and a tail rotor or a tandem rotor.

The main rotor provides an upward force to keep the helicopter in the air, as well as a lateral or forward or backward force to steer the helicopter in required directions. This can be by making the angle of incidence of the rotor blades of the main rotor vary cyclically at every revolution of the main rotor.

The main rotor has a natural tendency to deviate from its position, which may lead to uncontrolled movements and to a crash of the helicopter if the pilot loses control over the steering of the helicopter.

Solutions to slow down the effect have already been provided up to now, including the application of stabilizing rods or a stabilizing bar and weights on the rotor blades.

All these solutions make use of the known phenomenon of gyroscopic precession and the centrifugal forces to obtain the desired effect.

The tail rotor is not at all insensitive to this phenomenon, since it has to prevent the body to turn round the drive shaft of the rotor as a result of the resistance torque of the rotor on the body.

To this end, the tail rotor is erected such that it develops a lateral thrust which has to counteract the above-mentioned resistance torque of the rotor and the helicopter is provided with means which have to enable the pilot to control the lateral thrust so• as to determine the flight position round the vertical axis.

Since the tail of the helicopter tends to turn round the drive shaft of the main rotor, even in case of small variations in the drive torque of the main rotor, most helicopters are provided with a separate and autonomous mechanical or electromechanical system such as a gyroscope or the like which automatically compensates the thrust of the tail rotor for the unwanted rotations.

In general, the stability of a helicopter includes the result of the interaction between:

the rotation of the rotor blades; the movements of any possible stabilizing rods; compensation of the resistance torque of the main rotor by means of the tail rotor;

the system such as a gyroscope or the like to compensate for small undesired variations in the resistance torque of the main rotor; and control of the helicopter which controls the rotational speed of the main rotor and of the tail rotor.

When these elements are essentially in balance, the pilot should be able to steer the helicopter as desired.

This does not mean, however, that the helicopter can fly by itself and can thus maintain a certain flight position or maneuver, for example, hovering or making slow movements without the intervention of a pilot.

Moreover, flying a helicopter usually requires intensive training and much experience of the pilot, for both a full size operational real helicopter as well as a toy helicopter or a remote-controlled model helicopter.

The present disclosure aims to minimize one or several of the above-mentioned and other disadvantages by providing a simple and cheap solution to auto stabilize and control the helicopter in a horizontal plane, such that operating the helicopter becomes simpler and possibly reduces the need for long-standing experience of the pilot.

The helicopter should be able to move up or down by changing rotor rpm, or change heading by altering tail rotor rpm. The known helicopter cannot as effectively be controlled to move foreword or backwards, nor sideways left or right, namely the different dimensions.

In order to control a helicopter in flight, permanent commands are needed in those different dimensions to direct it towards the desired direction. Therefore, a system is needed to influence the lift force and motion of the rotor in a cyclical way.

SUMMARY

The present disclosure includes a remote control toy helicopter. The remote control toy helicopter comprises a body; a motor and a battery for the motor, the motor being controllable by a controller remote from the helicopter body. There is a main rotor with propeller blades which is driven by a rotor shaft on which the blades are mounted. The helicopter also includes an auxiliary rotor which is driven by the rotor shaft of the main rotor for rotation in the sense of rotation of the main rotor. There is a tail rotor which is driven by a second rotor shaft. The auxiliary rotor is provided with elongated elements or members extending essentially in a line with their longitudinal axis are at an acute angle relative to the blades of the main rotor. The auxiliary rotor is mounted in a swinging relationship on an oscillatory shaft which is provided essentially transversally to the rotor shaft of the main rotor and being directed essentially transversally to the longitudinal axis of the vanes. The auxiliary rotor is located relatively below the main rotor A control system is provided for moving the angle of incidence of at least one vane of the auxiliary rotor cyclically along at least part of a 360 degree rotation path around the rotor shaft. As such the angle between the plane of rotation of the at least one vane of the auxiliary rotor and the rotor shaft may vary.

The control system includes an actuator for engaging with an assembly depending from the auxiliary rotor. The interengagement of the actuator and assembly effects a change in the angle of incidence of at least one vane of the auxiliary rotor. The interaction occurs when the assembly engages with the actuator by the actuator engaging a depending arm associated with the assembly.

The actuator includes at least a portion of a cam outer engaging surface, the cam being mounted about the rotor shaft. The arm engages with the cam, and the arm is movable between different positions thereby to move the cam into different relative positions about the rotor shaft. The assembly of the auxiliary rotor engages the cam in different positions of engagement.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
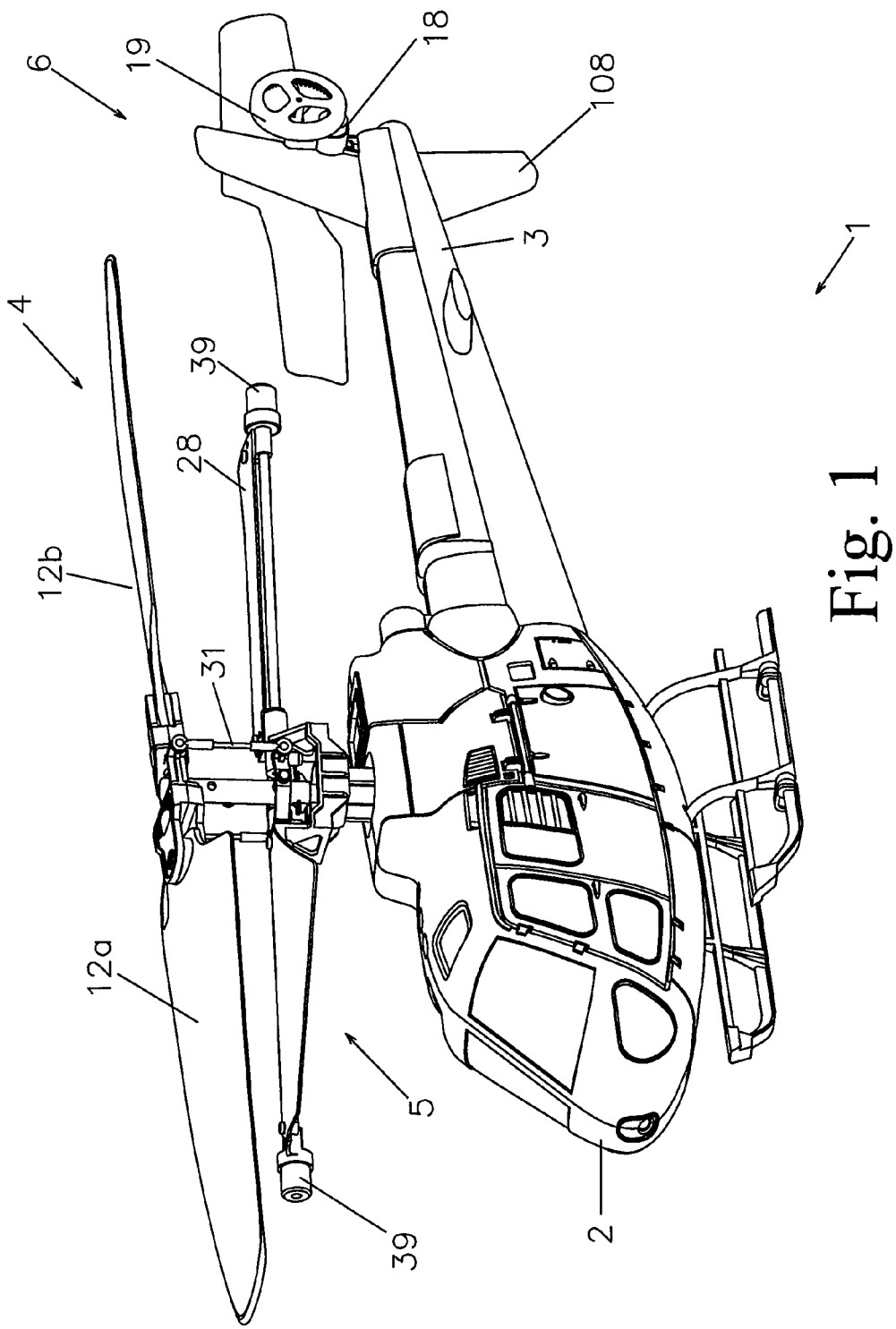
FIG. 1 represents a helicopter according to the disclosure in perspective.
Figure 2:
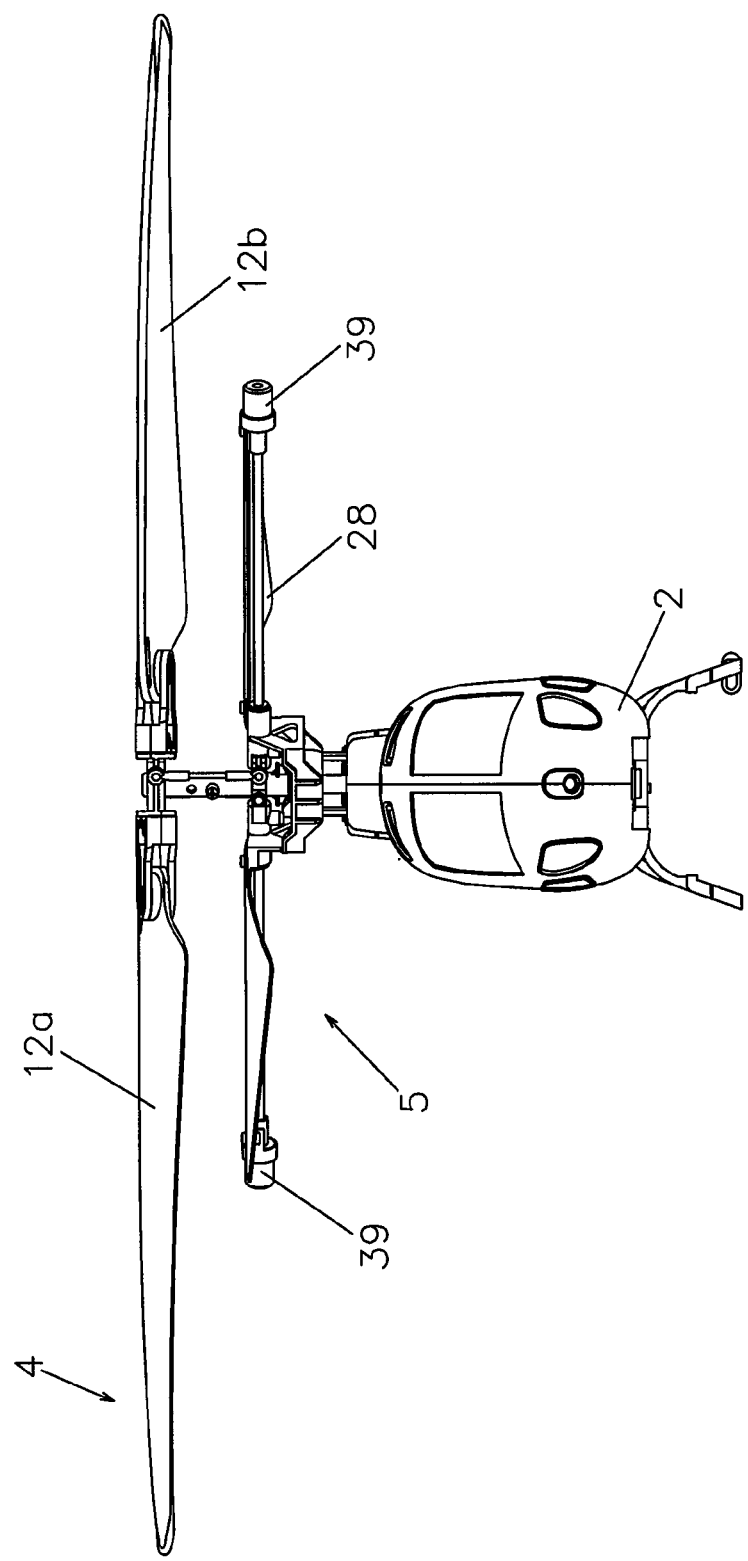
FIG. 2 represents a front view of a helicopter.

The following embodiments of an improved helicopter according to the disclosure are given as an example only, without being limitative in any way, with reference to the accompanying drawings.

A remote control toy helicopter 1 comprises a body 2; a motor 9 and a battery 11 for the motor 9, the motor 9 being controllable by a controller remote from the helicopter body 2. There is a main rotor 4 with propeller blades 12a and 12b which is driven by a rotor shaft 8 on which the blades 12a and 12b are mounted. A joint of the main rotor is a spindle 15 which is fixed to the rotor shaft 8 of the main rotor 4.

The helicopter also includes an auxiliary rotor 5 which is driven by the rotor shaft 8 of the main rotor 4 for rotation in the sense of rotation of the main rotor 4.

There is a second rotor 6 which is driven by a second rotor shaft. This can be a tail rotor or a tandem rotor for the helicopter. This second rotor 6 is spaced away form the main rotor 4, and is located towards the opposite end of the body 2 of the helicopter 1.

The auxiliary rotor 5 is provided with elongated elements or members 28, such as two vanes extending essentially in a line with their longitudinal axis 29. The auxiliary rotor 5 is mounted in a swinging relationship on an oscillatory shaft 30 which is provided essentially transversally to the rotor shaft 8 of the main rotor 4 and being directed essentially transversally to the longitudinal axis 29 of the elongated elements or members 28.

The main rotor 4 and the auxiliary rotor 5 are connected to each other by a mechanical link, such that the swinging motion of the auxiliary rotor 5 controls the angle of incidence of at least one of the rotor blades 12a and 12b of the main rotor 4.

A control system is provided for moving the angle of incidence of at least one vane 28 of the auxiliary rotor 5 cyclically along at least part of a 360 degree rotation path around the rotor shaft 8. As such the angle between the plane of rotation of the at least one vane 28 of the auxiliary rotor 5 and the rotor shaft 8 may vary.

The control system includes an actuator 206 for engaging with a control assembly for engaging the auxiliary rotor 5. The control assembly includes arms 214, a ring 204 and a actuator arm 216. The arms 214 are attached to the ring 204 at a bottom end and to a cam 210 at a top end. The actuator arm 216 attaches to the actuator 206 at a bottom end and the ring 204 at a top end. There are flanges 212 for engaging the cam 210 and the inter-engagement of the flanges 212 and the cam 210 effects a change in the angle of incidence of at least one vane 28 of the auxiliary rotor 5. The interaction occurs when the control assembly engages with the actuator 206 by the actuator 206 engaging the depending actuator arm 216 associated with the control assembly.

There can be multiple actuators, and the multiple actuators can be spaced circumferentially around the rotor shaft 8. The control assembly interacts at different circumferential positions relative to the rotor shaft 8, and the interaction occurring when selected actuators are aligned with a selected location of the control assembly.

The actuator 206 engages the actuator arm 216 to be movable between a position of repose and a position of inter-engagement with the control assembly. The degree of movement of and the force exercised by the actuator arm 216 effects the degree of interaction with the control assembly and the degree of change of change in the angle of incidence of at least one vane 28 of the auxiliary rotor 5.

The actuator 206 includes at least a portion of a cam 210 in the form of a donut like or ring like shape or in the form of a disk or cylinder. The cam 210 includes an outer engaging surface to forcibly engage a lower portion of the auxiliary rotor 5 in the form of a cam follower or flanges 212 mounted about the rotor shaft 8. As the actuator arm 216 engages with the control assembly to be movable between different positions thereby to move the cam 210 into different relative positions about the rotor shaft 8. The control assembly engages the cam 210 in different positions of engagement. The cam 210 gives to the part or parts, such as the cam follower or flanges 212 in contact with it a rocking or reciprocating motion.

Although a donut like or ring like shape is described for the cam 210, other forms shapes can be used as well. The outer inter-engaging surface of the cam 210 is curved or rounded as needed such that a smooth interaction between the cam 210 and the flanges 212 is possible. The flanges 212 extend downward from and rotate with the auxiliary rotor 5. The curved or rounded surface is preferable to minimize friction between the flanges 212 to which the cam 210 imparts a force to change the angle of incidence of the at least one vane 28. The shape is preferably circular such that the distance between the cam 210 and the flanges 212 is essentially the same whatever the inclination of the cam 210 or the actuator 206. If it were not, there would be friction or gaps and backlash would appear.

In sequence, the actuator 206 changes positions and causes the cam 210 to move relative to the rotor shaft 8. The movement of the cam 210 exerts a force of the flanges 212 of the auxiliary rotor 5 causing the auxiliary rotor 5 to pivot about the oscillatory shaft 30. The pivot about the oscillatory shaft 30 causes one tip of the auxiliary rotor 5 to swing up and the other to swing down. The pivot of the auxiliary rotor 5 about the oscillatory shaft 30 causes a change in the angle of incidence of the main rotor 4 thereby to effect movement of the helicopter 1 in the horizontal plane.

Figure 22:
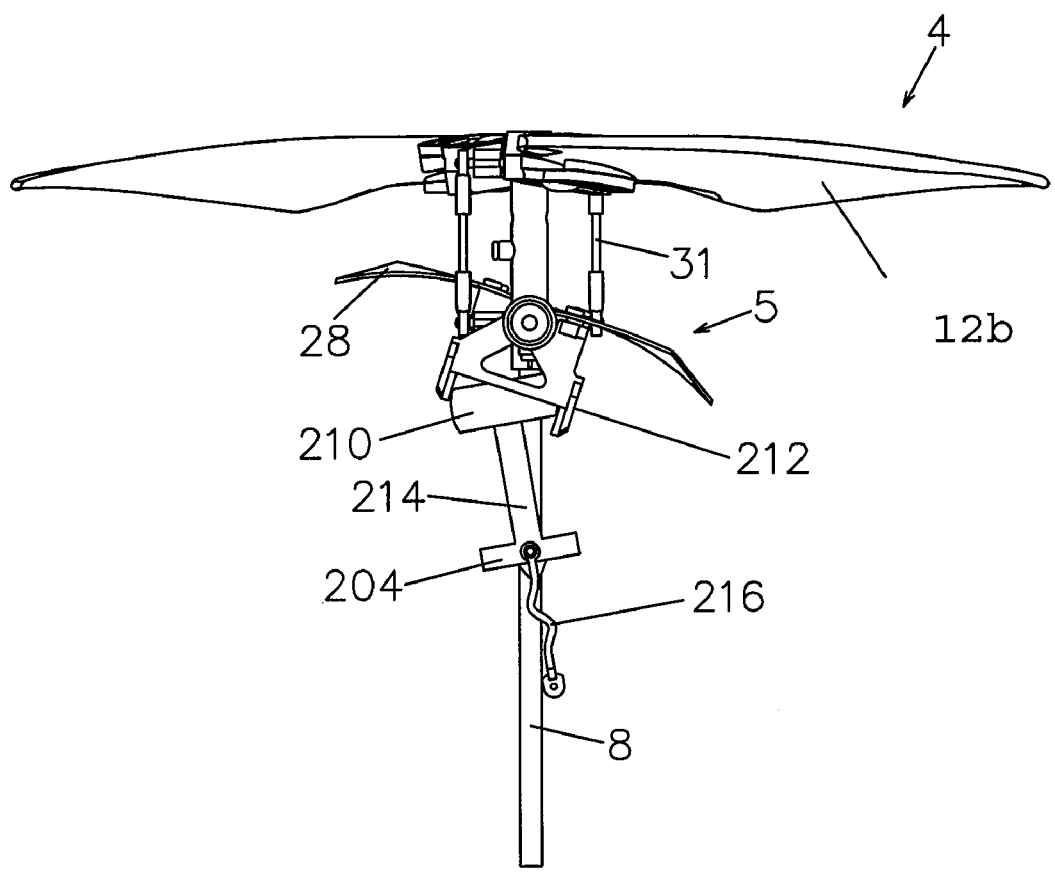
FIG. 22 is a side view of a rotor assembly.
Figure 23:
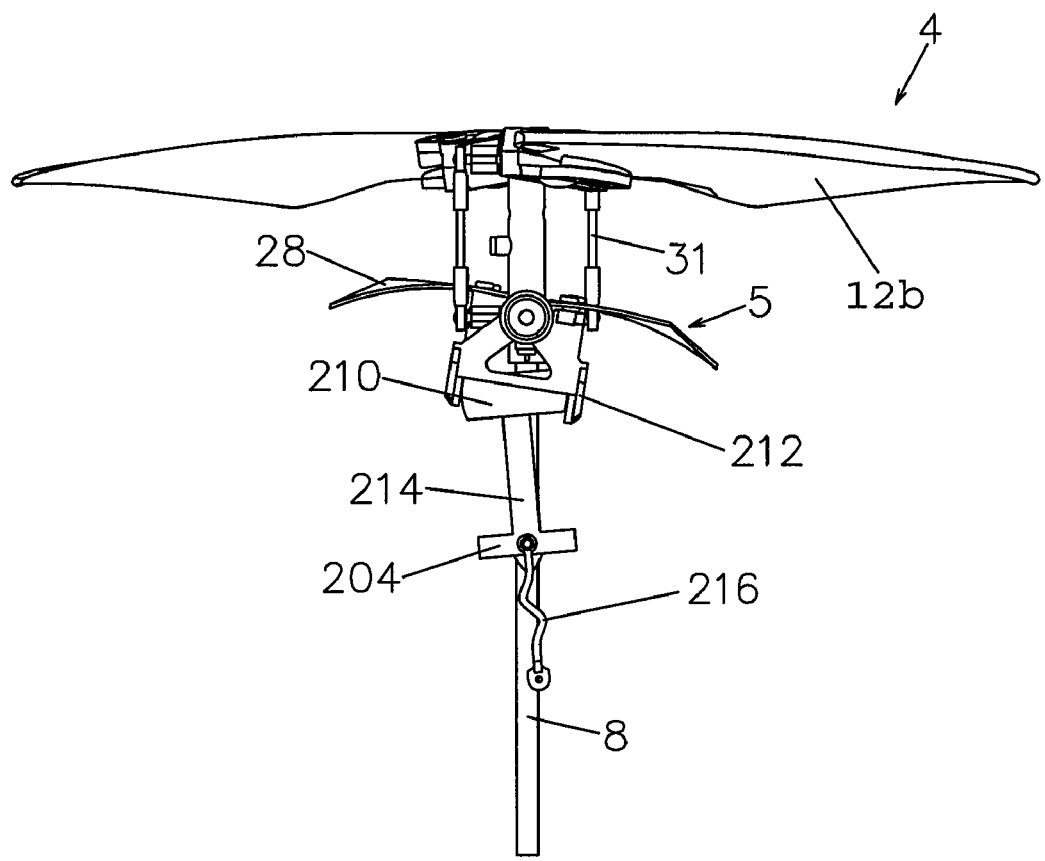
FIG. 23 is an additional side view of a rotor assembly.
Figure 24:
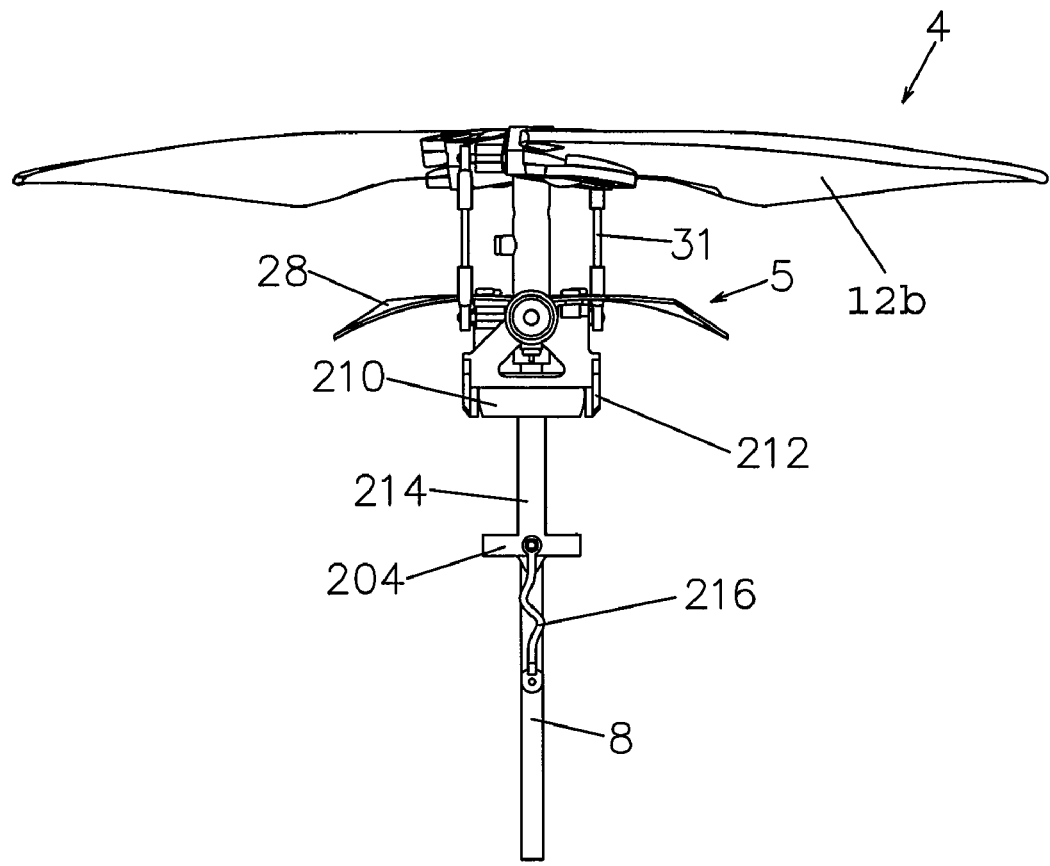
FIG. 24 is an additional side view of a rotor assembly.
Figure 25:
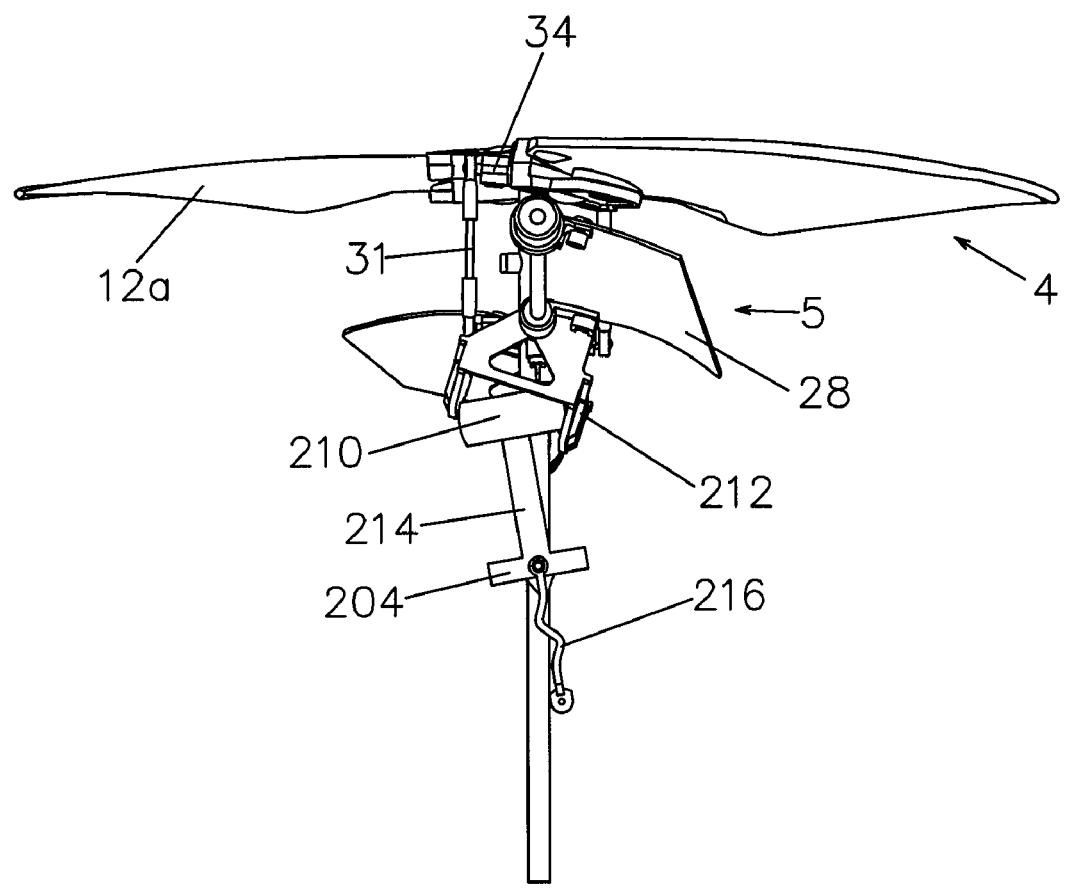
FIG. 25 is an additional side view of a rotor assembly.
Figure 26:
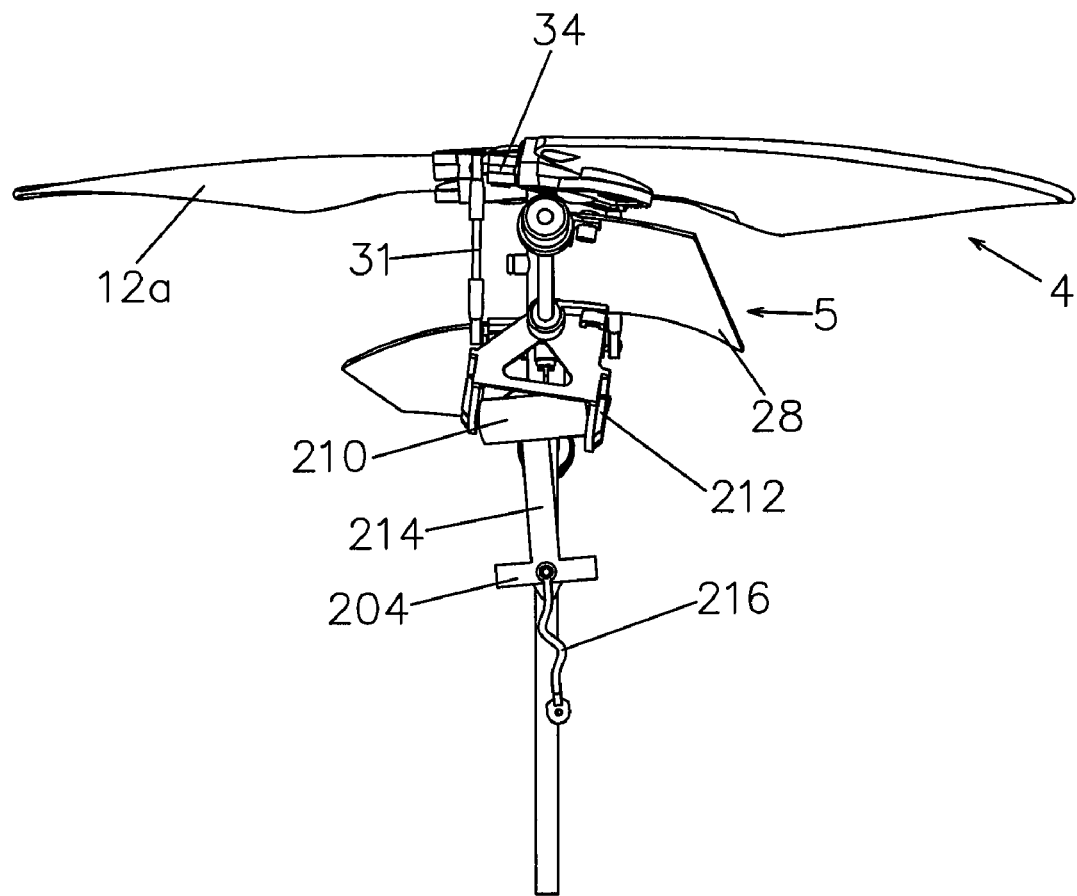
FIG. 26 is an additional side view of a rotor assembly.
Figure 27:
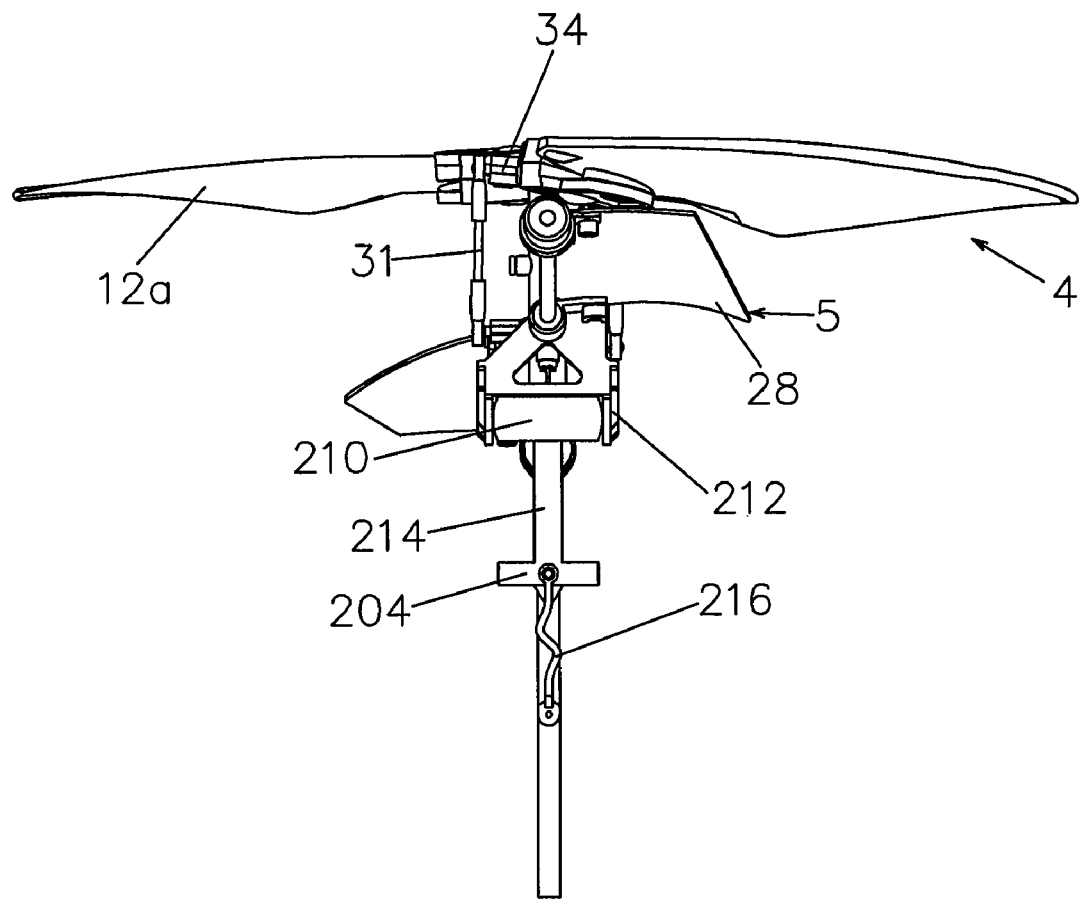
FIG. 27 is an additional side view of a rotor assembly.

FIGS. 22-27 are illustrative of different angles of incidence of the auxiliary rotor 5 as a result of different positions of the actuator 206. FIGS. 22-24 show three different positions of the cam 210 relative to the flanges 212 when the auxiliary rotor 5 is rotating in a plane parallel to the main rotor 4. FIGS. 25-27 show three different positions of the cam 210 relative to the flanges 212 when the auxiliary rotor 5 is tilted and rotating in a plane that is not parallel to the main rotor 4.

The cam 210 can take up a position in which the axis through the cam 210 is relatively coaxial with the rotor shaft 8. In another sense a cross-section transversely through the cam 210 is perpendicular to the rotor shaft 8. In other forms a ball type of configuration is used with a bore through the rotor shaft 8 passes in a manner that it is relatively unhindered and so that the shaft 8 can rotate about its axis without being impeded by the cam 210 or ball with an axis.

Figure 12:
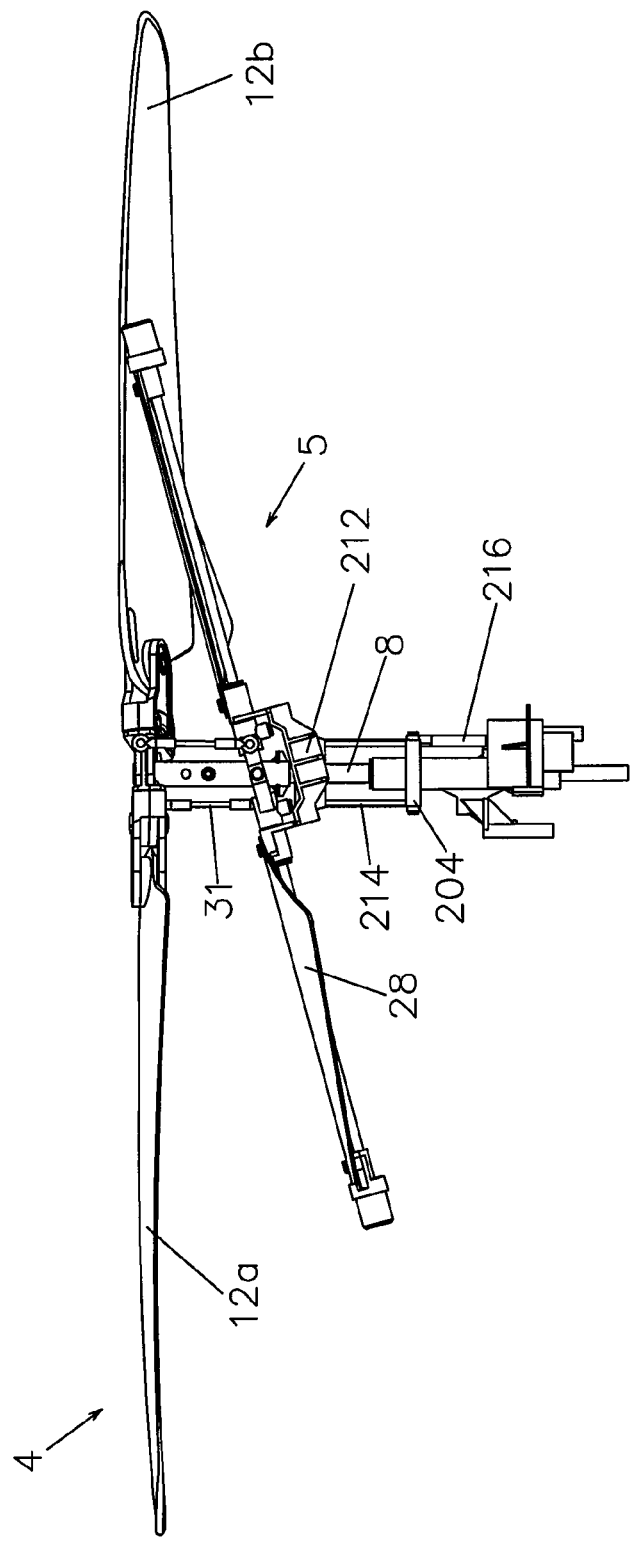
FIG. 12 is a front view of the rotor assembly with a tilted auxiliary rotor.
Figure 13:
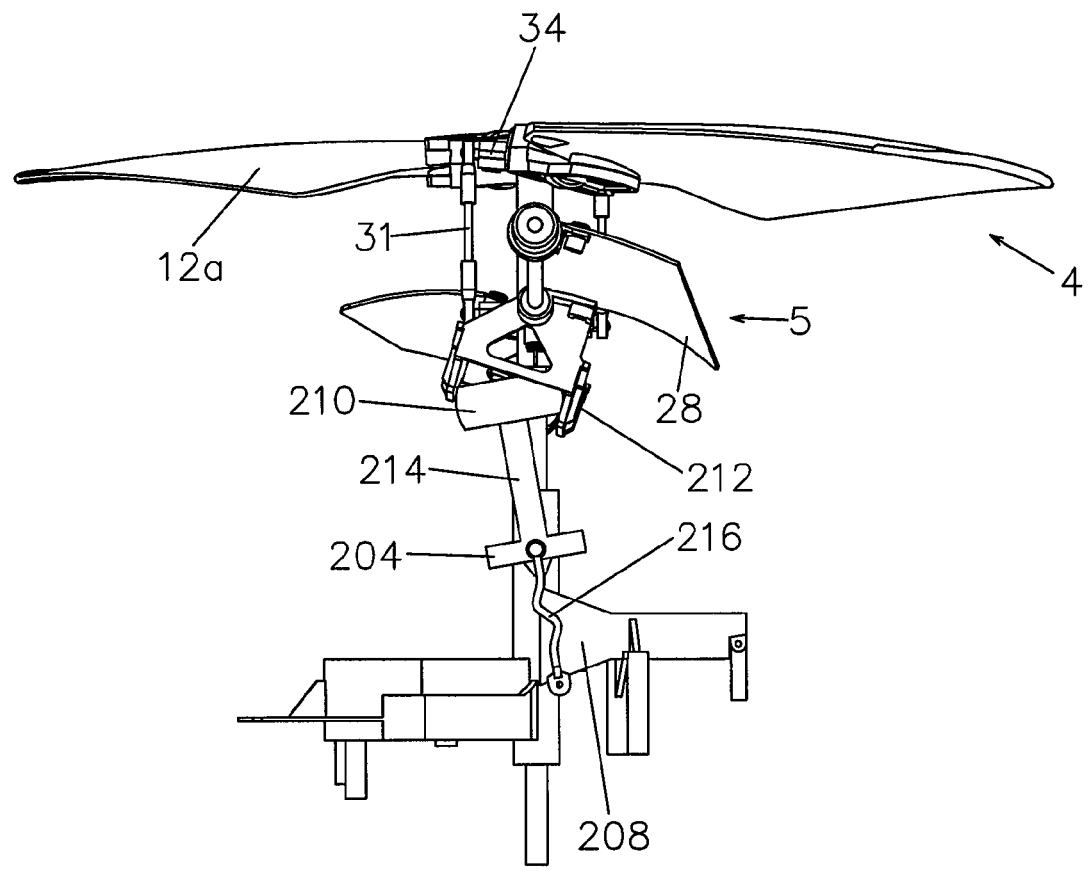
FIG. 13 is a side view of the rotor assembly with a tilted auxiliary rotor.
Figure 14:
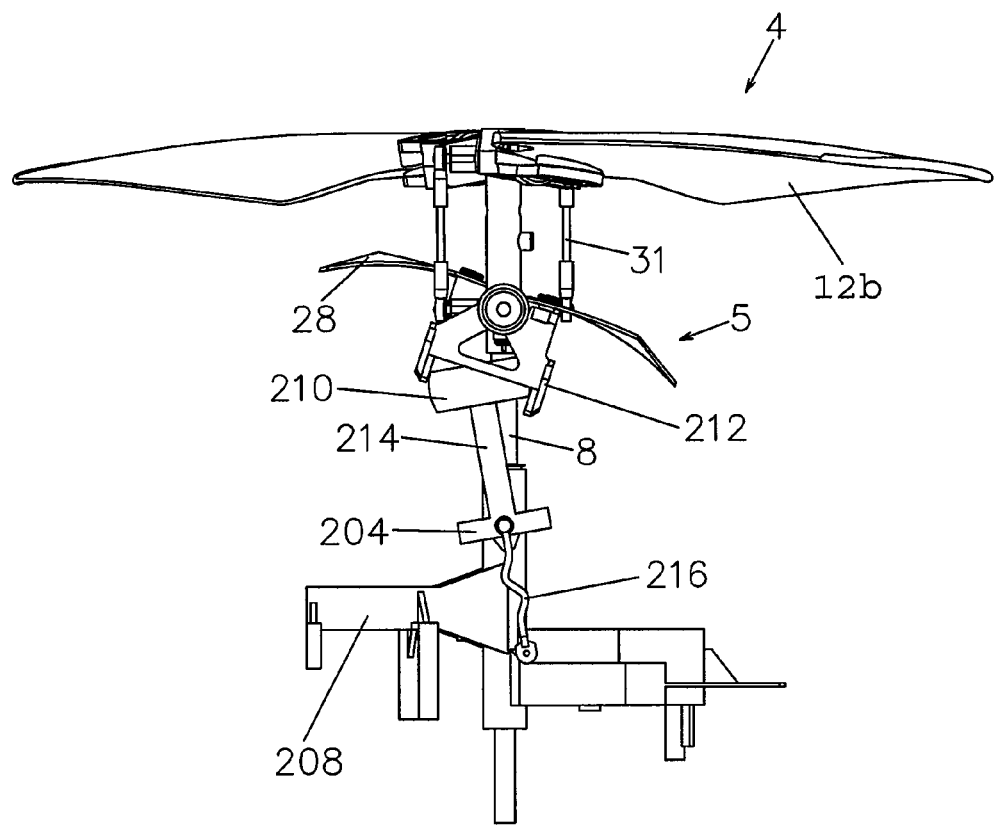
FIG. 14 is an additional side view of the rotor assembly with a tilted auxiliary rotor.
Figure 15:
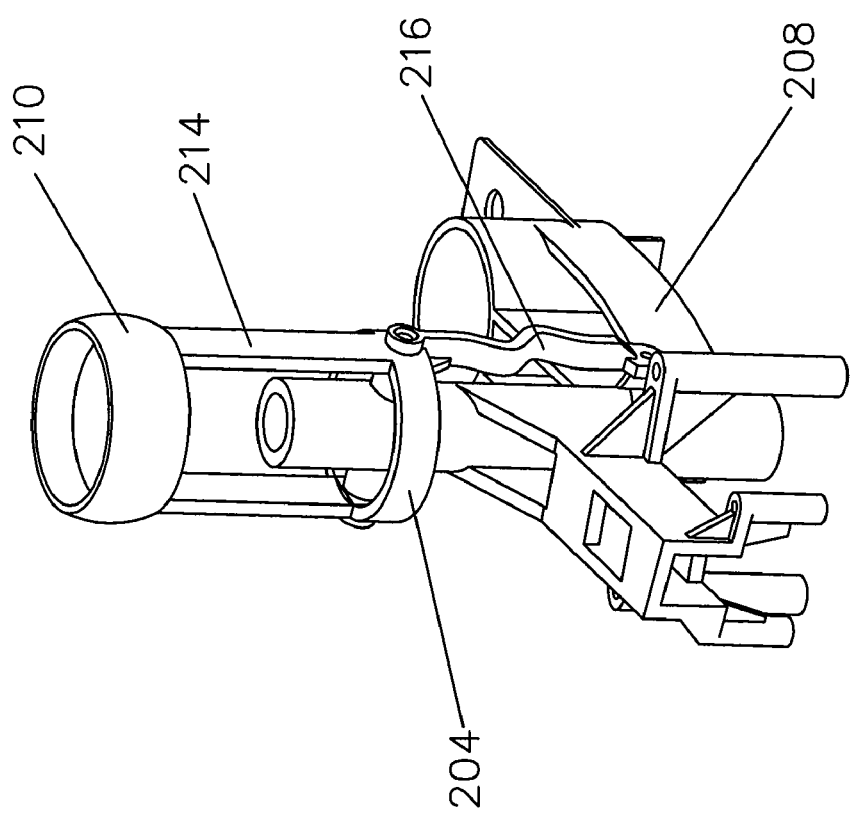
FIG. 15 is a perspective view of a base of a rotor assembly.
Figure 16:
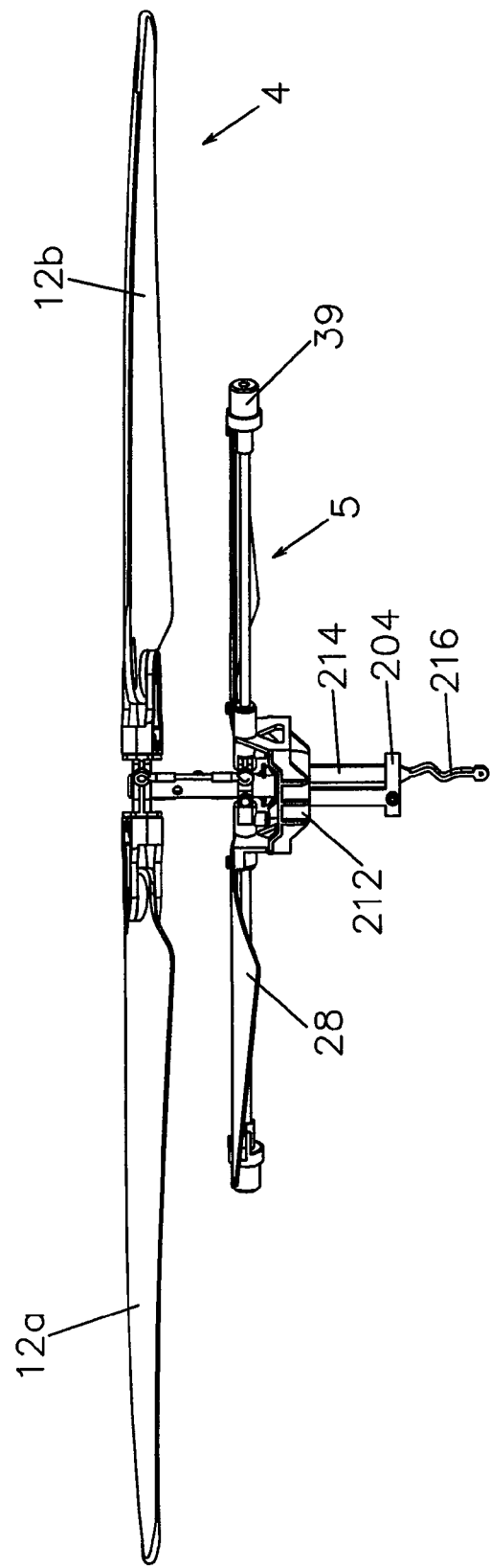
FIG. 16 is a front view of a rotor assembly.

The actuator 206 includes an element, such as actuator arm 216, movable between different positions, and the auxiliary rotor includes two side flanges 212 located about and rotatable with the rotor shaft 8. The cam 210 or ball allows the distance between contact points of the flanges 212 to remain the same when the flanges 212 tilt so that there is no gap or backlash between the flanges and the cam 210. FIGS. 12-14 are illustrative. The actuator 206 is located to be non-rotatable relative to the body 2.

The auxiliary rotor 5 is located relatively below the main rotor 5, however the auxiliary rotor 5 can be located above, and the auxiliary rotor 5 is effectively mechanically coupled with the control or actuator 206 located on the body 2. The control or actuator 206 is for effecting changes to the incidence angle of the vanes 28, and the auxiliary rotor 5 is hinge connected with the main rotor 5. The auxiliary rotor 5 includes vanes 28 mounted relatively to the rotor shaft 8 such that the angle of incidence of the vanes 28 is variable along a tip to tip axis 29 of the vanes 28. The auxiliary rotor 5 includes side flanges 212, the side flanges 212 being for interaction with the cam 210 thereby to change the vanes 28 incidence angle.

Figure 18:
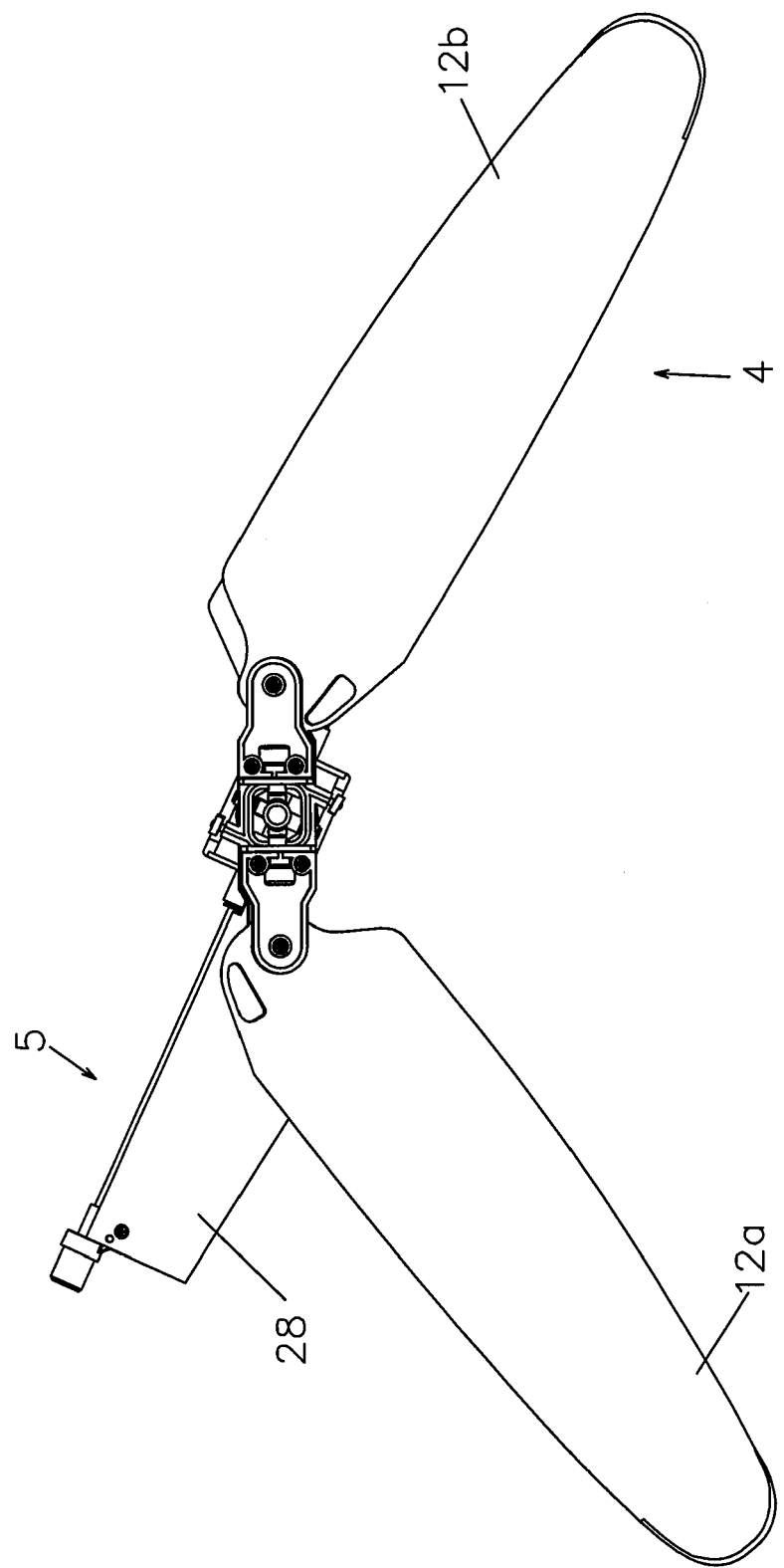
FIG. 18 is an additional top view of a rotor assembly.
Figure 19:
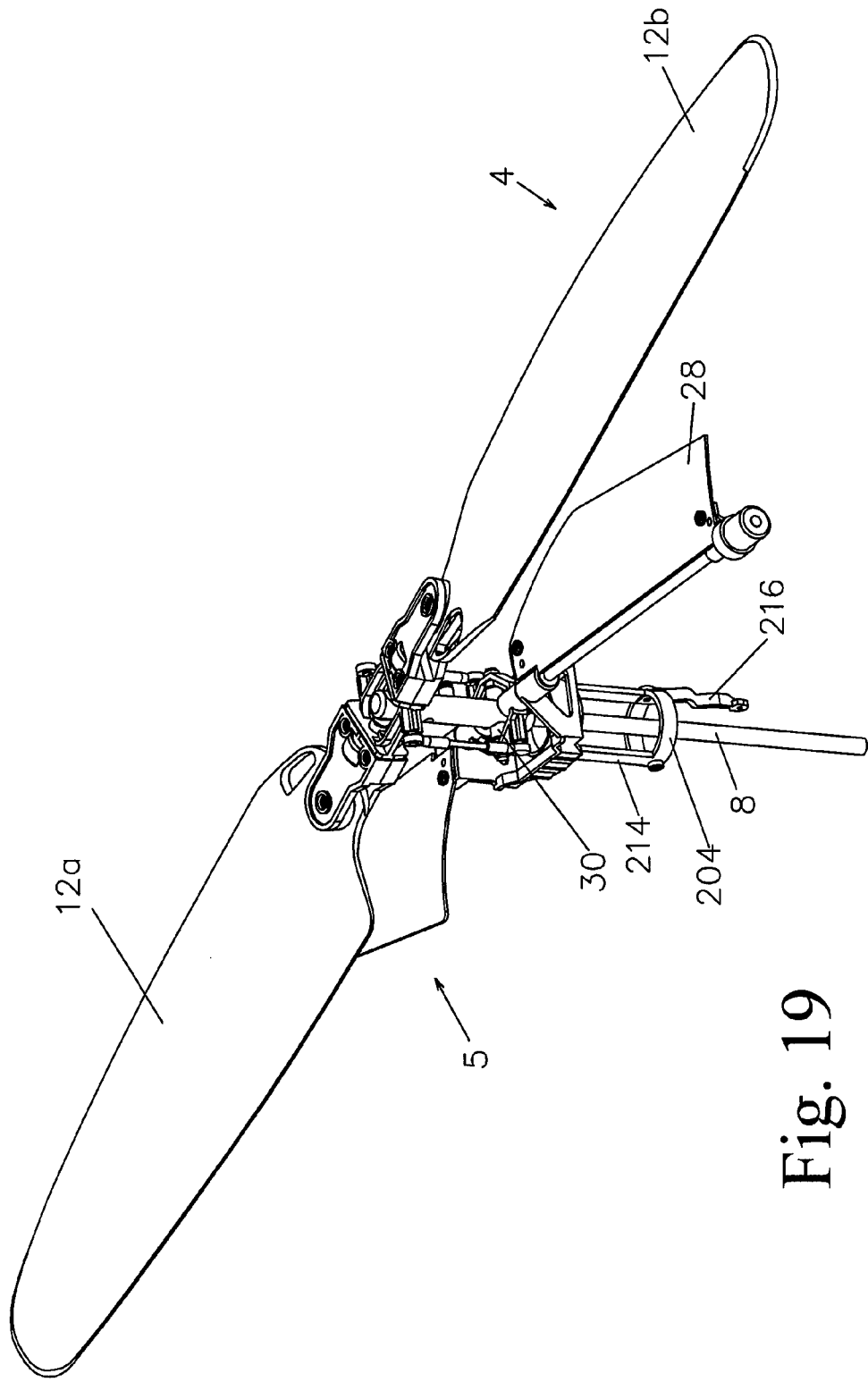
FIG. 19 is a perspective view of a rotor assembly.
Figure 20:
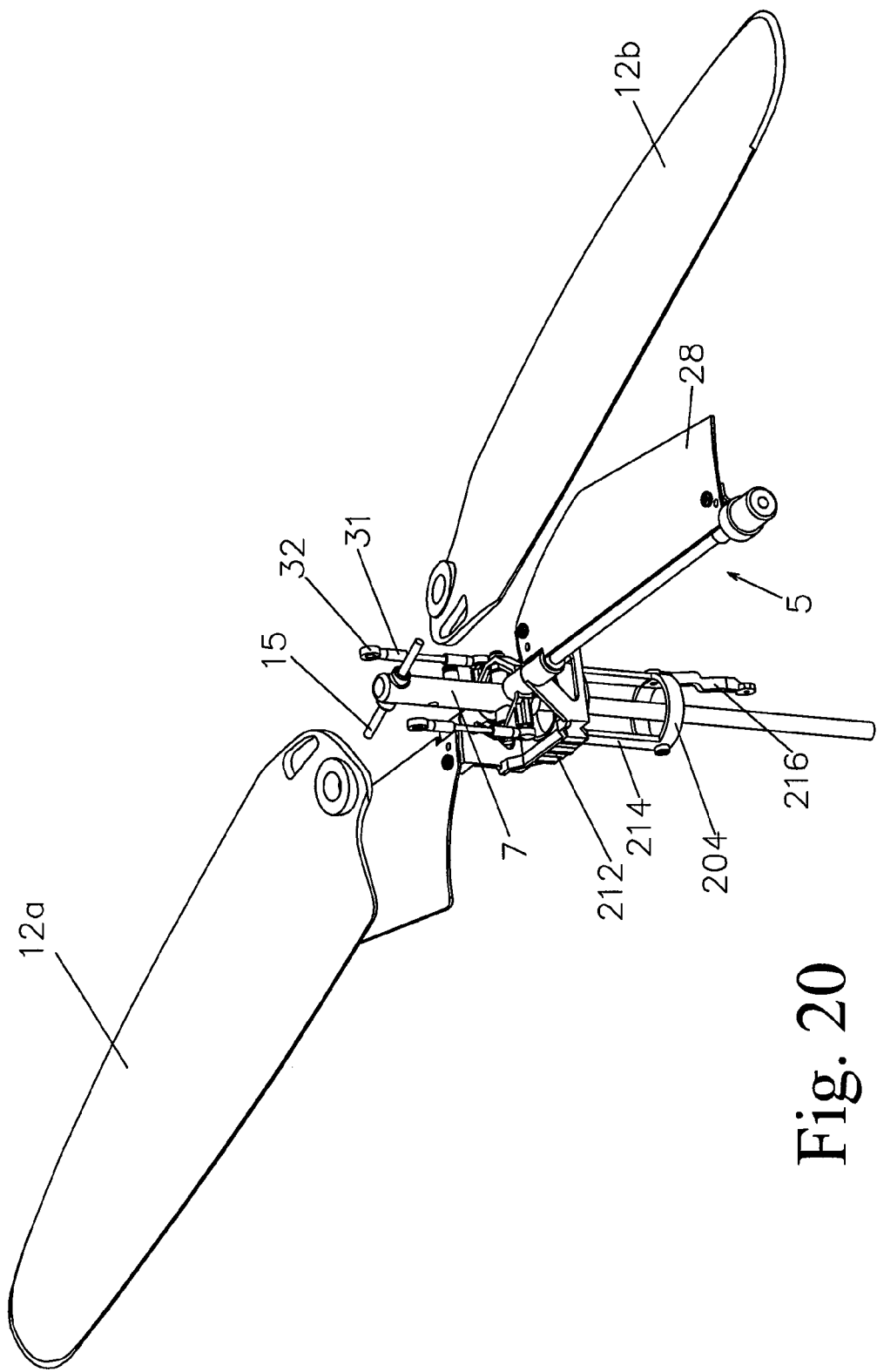
FIG. 20 is an additional perspective view of a rotor assembly.
Figure 21:
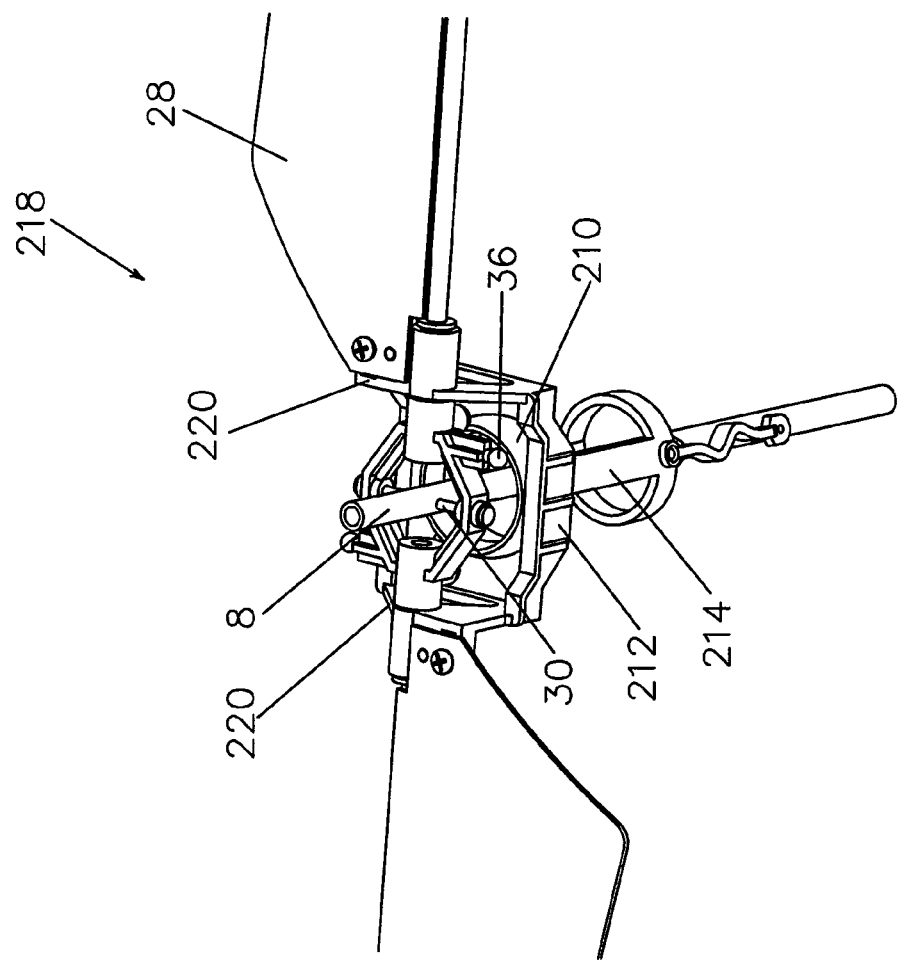
FIG. 21 is a perspective view of a rotor assembly.

The main rotor 5 defines a plane of rotation 14, and the rotor 5 includes components such as rotor blades 12a and 12b, the components being relatively movable to each other, the relative motion being possible in the plane of rotation 14. Further the rotor blades 12a and 12b include portions mounted to permit swiveling about an axis, the axis being located transverse the plane for rotation 14, as shown in FIG. 18.

The main rotor blades 12a and 12b and auxiliary rotor vanes 28 each respectively have a longitudinal axis extending essentially from tip to tip of the respective rotors. Preferably, the respective longitudinal axes are located at an acute angle less than about 45 degrees in the sense of rotation relative to each other. The respective longitudinal axes can, however, be located at any angle in the sense of rotation relative to each other. However, the angle is between about 45 to 15 degrees, and preferably about 25 degrees with the longitudinal axis 13 of one of the rotor blades of the main rotor 4. The auxiliary rotor 5 is rotatable tip to tip in a swinging motion which is also a direction transverse to the sense of rotation, namely the plane of rotation about the oscillatory shaft 30 and wherein the auxiliary rotor 5 is mounted below the main rotor 4.

The rotor blades 12a and 12b of the main rotor 4 and a central hub of the auxiliary rotor 5 respectively, are connected to each other through a mechanical linkage. The central hub 218 includes the flanges 212, mountings 220 for the vanes 28 and hinge joints for mechanically linking the main rotor 4 with the auxiliary rotor 5. The mechanical linkage includes a rod coupling 31 and hinge joints, the joints with the main rotor 4 and the auxiliary rotor 5 being located relatively transversally to the rotor shaft 8 and spaced from the rotor shaft 8. The coupling is relatively parallel to the rotor shaft 8, and is spaced from the rotor shaft 8. The spindle 15 of the main rotor 4 is directed essentially parallel to the longitudinal axis 13 of the main rotor 4.

The rod coupling 31 is mounted to a vane 28 of the auxiliary rotor 5 with one fastening point 36 and is hinge-mounted with another fastening point 33 to rotor blade 12b of the main rotor 4 which is parallel to one of the vanes 28 or is at an acute angle relative to the blade 12b.

The disclosure is also directed to a rotor assembly for a remote control toy helicopter 1. There is a main rotor 4 having two propeller blades 12a and 12b mounted on a rotor shaft 8 for rotation with the rotor shaft 8, and an auxiliary rotor 5 mounted on the rotor shaft 8 for rotation in the sense of rotation of the main rotor 4. The auxiliary rotor 5 is mounted in a swinging relationship on an oscillatory shaft 30 provided essentially transverse to the rotor shaft 8 of the main rotor 4 and the swinging motion being relatively upwardly and downwardly about the oscillatory shaft 30.

The main rotor 4 and the auxiliary rotor 5 have planes of rotation spaced from each other and being linked with each other by a mechanical linkage, such that the swinging motion of the auxiliary rotor 5 controls an angle of incidence of the propeller blades 12a and 12b of the main rotor 4.

At least one propeller blade 12a and 12b of the main rotor 4 is for pivotally mounting on a spindle 15 which is fixed on the rotor shaft 8. There is a control operable under reaction with an actuator 206 for moving the angle of incidence of at least one elongated rotor element 28 of the auxiliary rotor 5 cyclically along at least part of a 360 degree rotation path around the rotor shaft 8. As such that the angle between the plane of rotation of the at least one elongated rotor element 28 of the auxiliary rotor 5 and the rotor shaft 8 may vary.

The disclosure is further described in detail.

In flight, the rotors 4, 5 and 6 are driven at a certain speed, as a result of which a relative air stream is created in relation to the rotors, as a result of which the main rotor 4 generates an upward force so as to make the helicopter 1 rise or descend or maintain a certain height, and the tail rotor 6 develops a laterally directed force which is used to steer the helicopter 1.

It is impossible for the main rotor 4 to adjust itself, and it will turn in the plane 14 in which it has been started, usually the horizontal plane. Under the influence of gyroscopic precession, turbulence and other factors, it will take up an arbitrary undesired position if it is not controlled.

The surface of rotation of the auxiliary rotor 5 may take up another inclination in relation to the surface of rotation 14 of the main rotor 8, whereby both rotors 5 and 4 may take up another inclination in relation to the rotor, shaft 8.

This difference in inclination may originate in any internal or external force or disturbance whatsoever.

In a situation whereby the helicopter 1 is hovering stable, on a spot in the air without any disturbing internal or external forces, the auxiliary rotor 5 keeps turning in a plane which is essentially perpendicular to the rotor shaft 8.

If, however, the body 2 is pushed out of balance due to any disturbance whatsoever, and the rotor shaft 8 turns away from its position of equilibrium, the auxiliary rotor 5 does not immediately follow this movement, since the auxiliary rotor 5 can freely move round the oscillatory shaft 30.

The main rotor 4 and the auxiliary rotor 5 are placed in relation to each other in such a manner that a swinging motion of the auxiliary rotor 5 is translated almost immediately in the pitch or angle of incidence A of the propeller blades 12 being adjusted.

For a two-bladed main rotor 4, this means that the propeller blades 12 and the vanes 28 of both rotors 4 and 5 must be essentially parallel or, seen in the sense of rotation R, enclose an acute angle with one another of for example 10° in the case of a large main rotor 4 and a smaller auxiliary rotor 5.

This angle can be calculated or determined by experiment for any helicopter 1 or per type of helicopter.

If the axis of rotation 8 takes up another inclination than the one which corresponds to the above-mentioned position of equilibrium in a situation whereby the helicopter 1 is hovering, the following happens:

A first effect is that the auxiliary rotor 5 will first try to preserve its absolute inclination, as a result of which the relative inclination of the surface of rotation of the auxiliary rotor 5 in relation to the rotor shaft 8 changes.

As a result, the rod 31 will adjust the angle of incidence A of the propeller blades 12, so that the upward force of the propeller blades 12 will increase on one side of the main rotor 4 and will decrease on the diametrically opposed side of this main rotor.

Since the relative position of the main rotor 4 and the auxiliary rotor 5 are selected such that a relatively immediate effect is obtained. This change in the upward force makes sure that the rotor shaft 8 and the body 21 are forced back into their original position of equilibrium.

A second effect is that, since the distance between the far ends of the vanes 28 and the plane of rotation 14 of the main rotor 4 is no longer equal and since also the vanes 28 cause an upward force, a larger pressure is created between the main rotor 4 and the auxiliary rotor 5 on one side of the main rotor 4 than on the diametrically opposed side.

A third effect plays a role when the helicopter begins to tilt over to the front, to the back or laterally due to a disturbance. Just as in the case of a pendulum, the helicopter will be inclined to go back to its original situation. This pendulum effect does not generate any destabilizing gyroscopic forces as with the known helicopters that are equipped with a stabilizer bar directed transversally to the propeller blades of the main rotor. It acts to reinforce the first and the second effect.

The effects have different origins but have analogous natures. They reinforce each other so as to automatically correct the position of equilibrium of the helicopter 1 without any intervention of a pilot.

There is also a control system for moving the angle of incidence of at least one vane 28 of the auxiliary rotor 5 cyclically along a 360 degree rotation path around the vertical rotor shaft 8, causes a variation in lift force of the blade along the rotation path thereby cause the body to be urged in a relatively different directions. By the term, angle of incidence, there is meant the relative angle of attack of the blade in the plane of rotation.

The control system includes an actuator 206 for engaging with a control assembly depending from the rotor the inter-engagement of the actuator and control assembly effecting a change in the angle of incidence of at least the one vane of the rotor.

In different formats, the system is a multi-control or a multi-channel system for controlling the helicopter in different directions.

The control includes an actuator for engaging with a control assembly depending from the rotor. The inter-engagement of the actuator and assembly effects a change in the angle of incidence of at least one vane of the rotor.

The interaction occurs when the assembly is aligned with the actuator. There can be multiple actuators, the multiple actuators being spaced circumferentially around the rotor shaft thereby to interact with the assembly at different circumferential positions relative to the rotor shaft. The interaction occurs when selected actuators are aligned with selected locations of the assembly, for instance where the actuator engages the surface of the cam, donut, ball or ring.

The stability of the helicopter system preferably continues to operate together with the applied control when the control is applied. The degree to which the control system is dominant over the stability system data determines the rate of change in position.

The actuator is applied thereby to cause the blade to turn on the feather axis of the vane, the actuator being effectively applied selectively to the blade through a system to operate the actuator thereby to effect the angle of incidence of the blade periodically or at selected times, or at selected angles in the 360 degree rotation determined essentially by the position of the actuator on the body. There is selective interactive force or movement thereby to selectively change the vane angle of incidence in requisite response to the actuator.

The actuator selectively changes the vane angle of incidence in requisite response to the actuator, and periodically or at selected times, or at selected angles in the 360 degree rotation determined essentially by the position of the actuator on the body. This permit the vane angle to be responsive to forces unrelated to the actuator.

In case of malfunction or the like, whereby the helicopter starts to turn round the rotor shaft of the main rotor in an unwanted manner, the tail rotor, as a result of the gyroscopic precession acting on the rotating tail rotor as a result of the rotation round the rotor shaft of the main rotor, should tilt round the swing shaft of the tail rotor at a certain angle.

By measuring the relative angular displacement of the swing and by using the measured signal as an input signal for a microprocessor which controls the drive of the main rotor and the drive of the tail rotor as a function of a stabilizer algorithm, the thrust of the tail rotor can be adjusted so as to counteract the unwanted effect of the disturbance and to thus automatically restore the stable flight conditions for the helicopter, with minimal or any intervention of the pilot.

The main rotor with blades is driven by a rotor shaft on which the blades are mounted. The auxiliary rotor is driven by the rotor shaft of the main rotor and is provided with vanes from the rotor shaft in the sense of rotation of the main rotor.

The helicopter 1 represented in the figures by way of example is a remote-controlled helicopter which essentially consists of a body 2 with a landing gear and a tail 3; a main rotor 4; an auxiliary rotor 5 driven synchronously with the latter and a tail rotor 6.

The main rotor 4 is provided by means of what is called a rotor head 7 on a first upward directed rotor shaft 8 which is bearing-mounted in the body 2 of the helicopter 1 in a rotating manner and which is driven by means of a motor 9 and a transmission 10, whereby the motor 9 is for example an electric motor which is powered by a battery 11.

The main rotor 4 in this case has two blades 12a and 12b which are in line or practically in line, but which may just as well be composed of a larger number of blades 12a and 12b.

Figure 8:
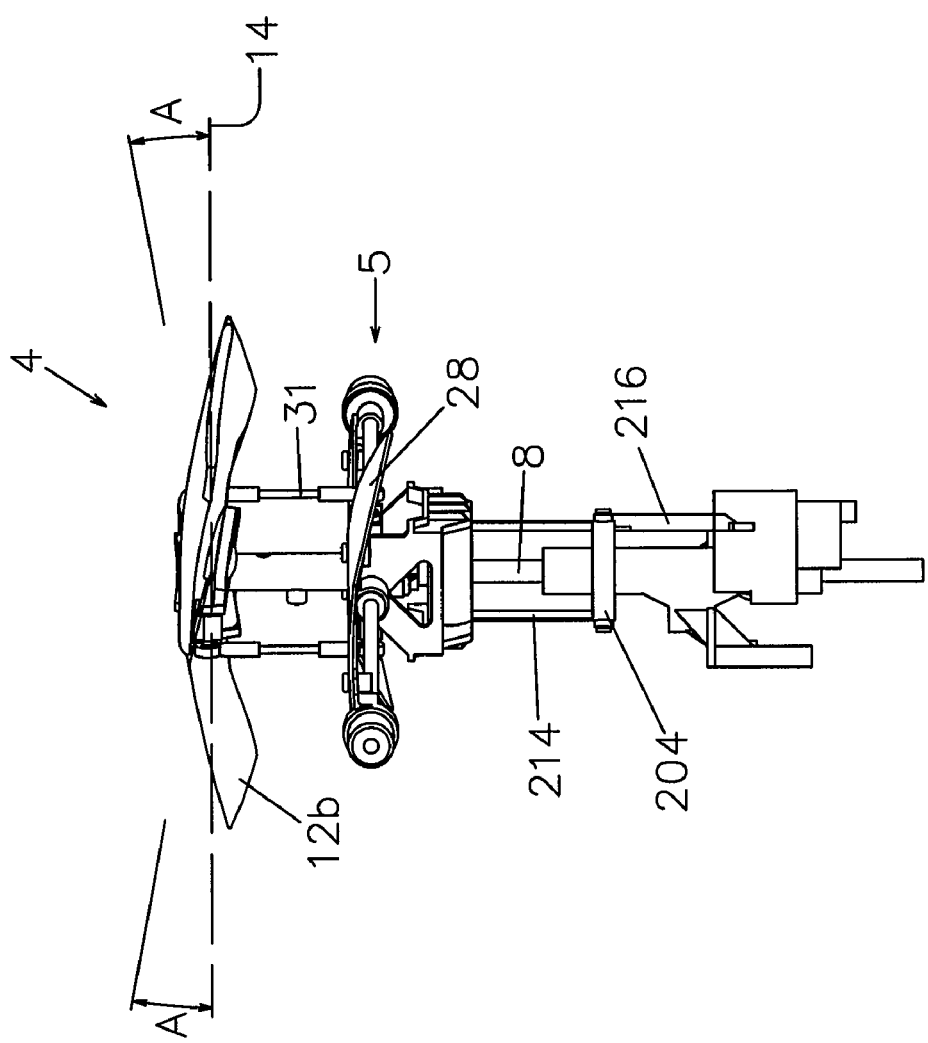
FIG. 8 is a side view of a rotor assembly.
Figure 9:
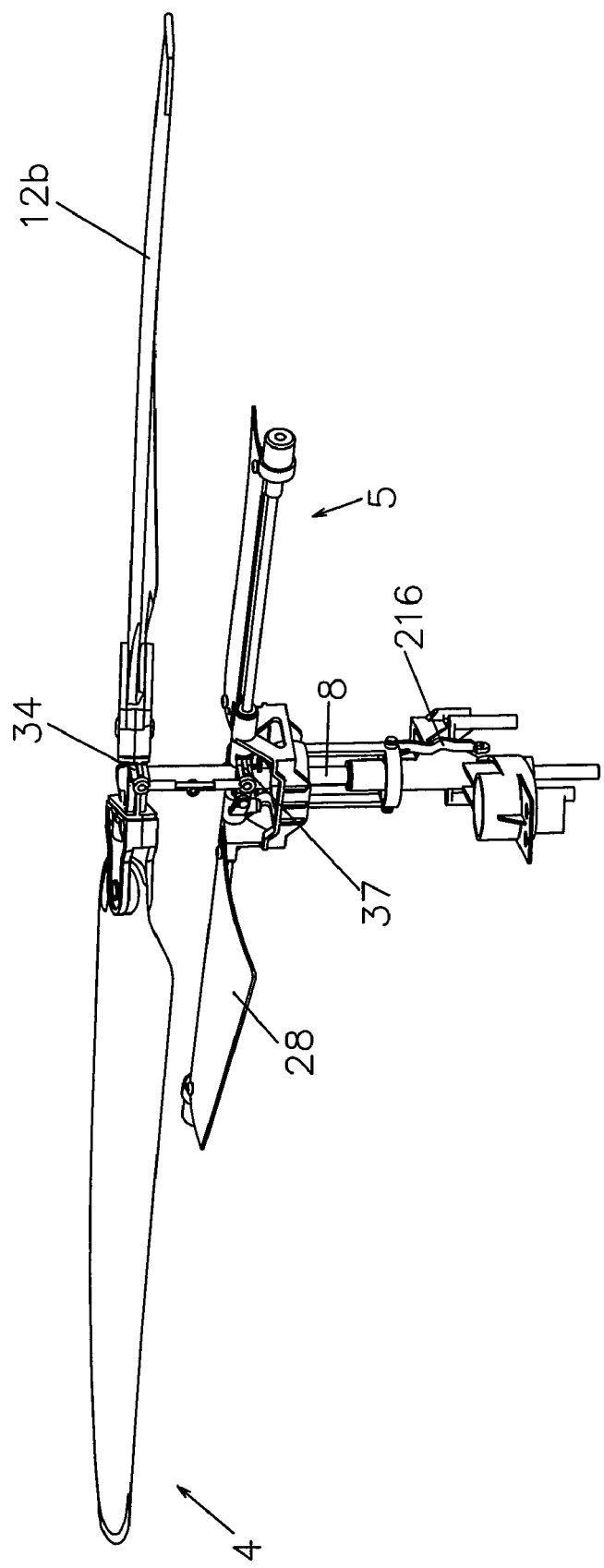
FIG. 9 is a perspective view of a rotor assembly.
Figure 10:
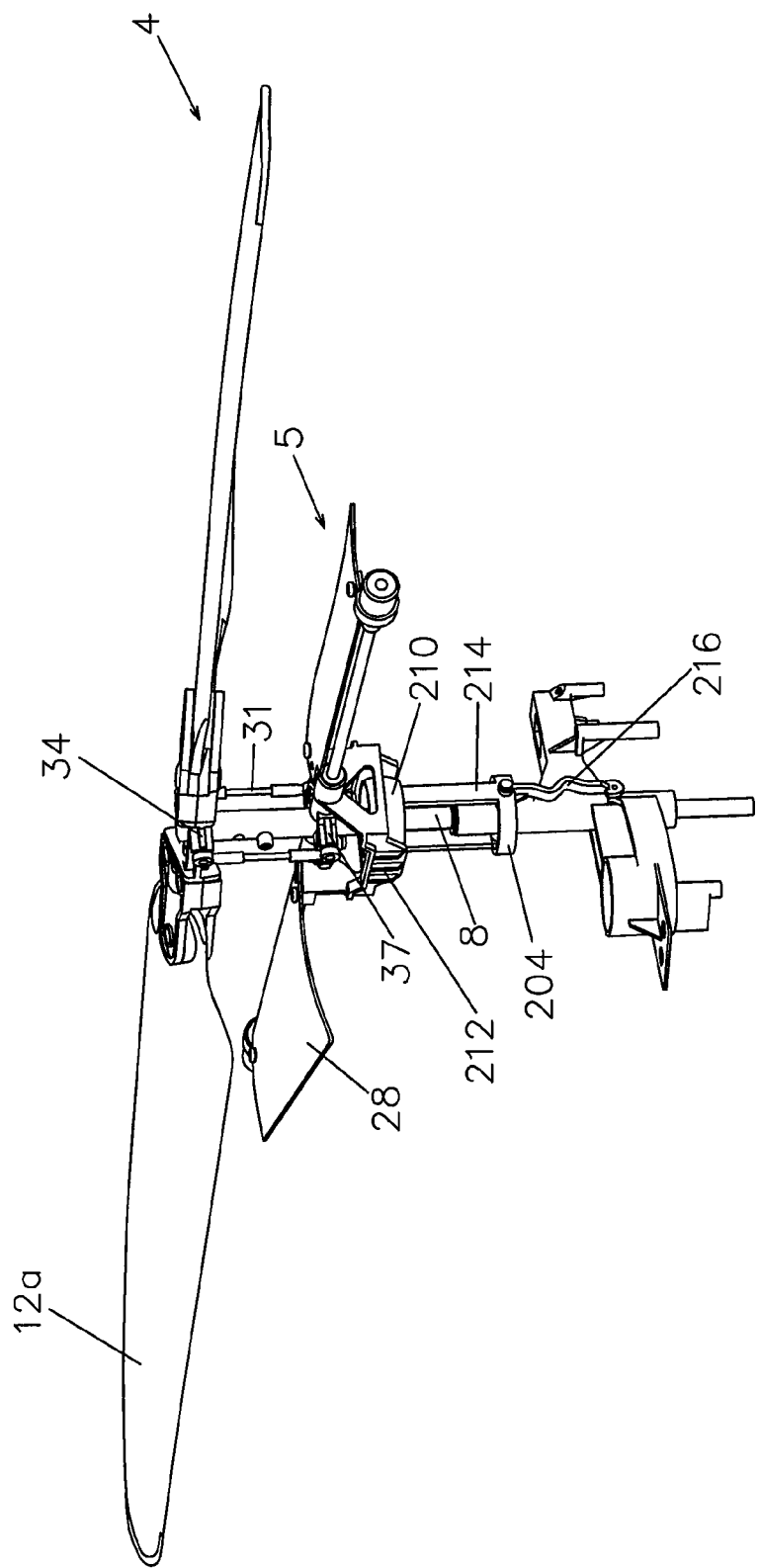
FIG. 10 is an additional perspective view of a rotor assembly.
Figure 11:
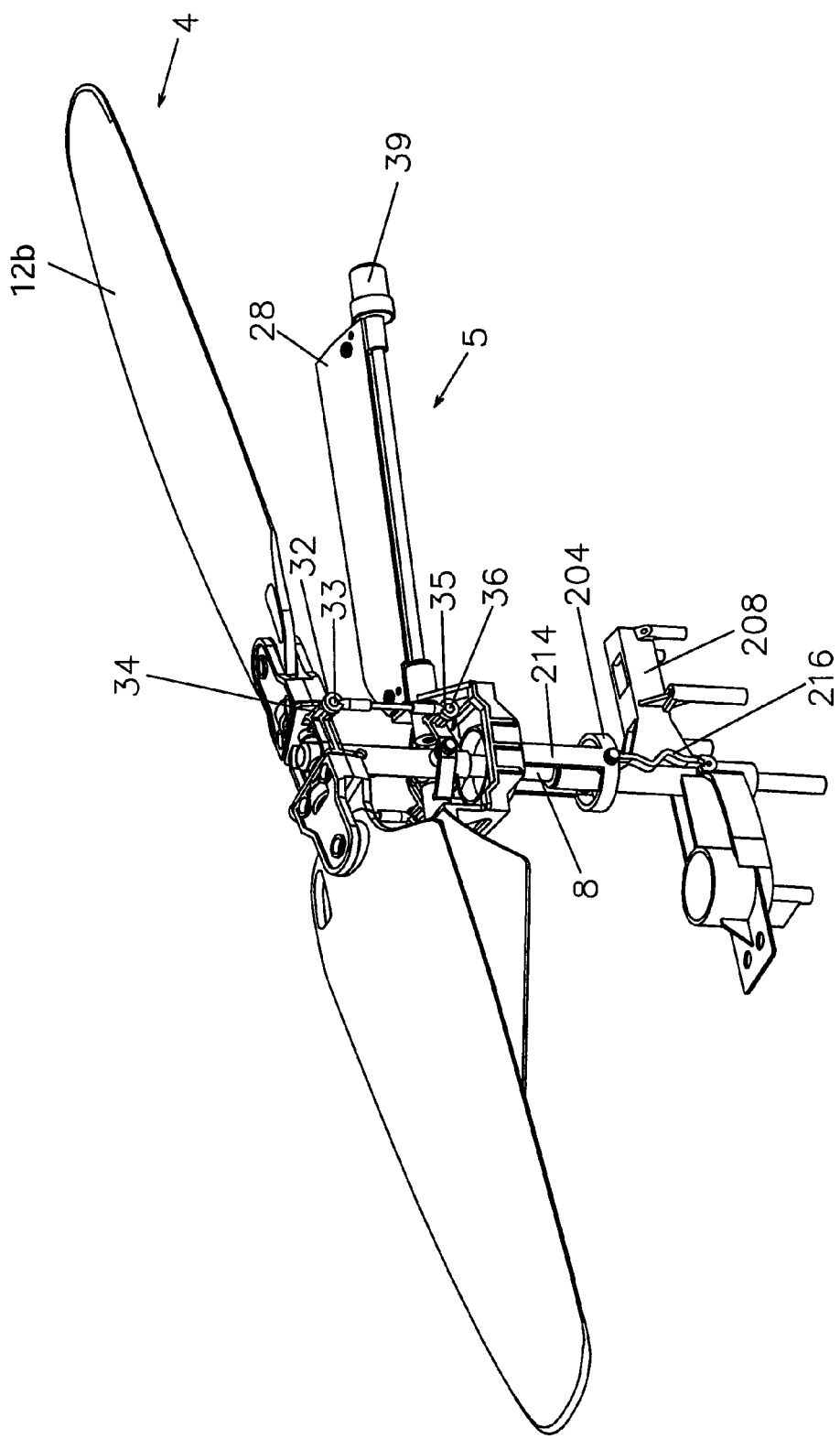
FIG. 11 is an additional perspective view of a rotor assembly.

The tilt or angle of incidence A of the rotor blades 12a and 12b, in other words the angle A which forms the rotor blades 12a and 12b as represented in FIG. 8 with the plane of rotation 14 of the main rotor 4, can be adjusted as, the main rotor 4 is hinge-mounted on this rotor shaft 8 by means of a joint, such that the angle between the plane of rotation of the main rotor and the rotor shaft may vary.

In the case of the example of a main rotor 4 with two blades 12a and 12b, the joint is formed by a spindle 15 of the rotor head 7. The axis of the spindle 15 is directed transversal to the rotor shaft 8 and essentially extends in the direction of the longitudinal axis 13 of one of the rotor blades 12a and 12b.

The helicopter 1 is also provided with an auxiliary rotor 5 which is driven substantially synchronously with the main rotor 4 by the same rotor shaft 8 and the rotor head 7.

The auxiliary rotor 5 in this case has two vanes 28 which are essentially in line with their longitudinal axis 29, whereby the longitudinal axis 29, seen in the sense of rotation of the main rotor 4, is situated at an angle relative to the longitudinal axis 13 of blades 12a and 12b of the main rotor 4 or encloses a relatively small acute angle C with the latter, so that both rotors 4 and 5 extend more or less parallel on top of one another with their blades and vanes 28.

The diameter of the auxiliary rotor 5 is preferably smaller than the diameter of the main rotor 4 as the vanes 28 have a smaller span than the rotor blades. The auxiliary rotor 5 is provided in a swinging manner on an oscillating shaft 30 which is fixed to the rotor head 7 of the rotor shaft 8. This is directed transversally to the longitudinal axis of the vanes 28 and transversally to the rotor shaft 8.

The main rotor 4 and the auxiliary rotor 5 are connected to each other by a mechanical link which is such of the auxiliary rotor 5 the angle of incidence A of at least one of the rotor blades 12a and 12b of the main rotor 4. In the given example this link is formed of a rod 31.

This rod 31 is hinge-mounted to a blade 12 of the main rotor 4 with one fastening point 32 by means of a joint 33 and a lever arm 34 and with another second fastening point 35 situated at a distance from the latter, it is hinge-mounted to the central hub of the auxiliary rotor 5 by means of a second joint 36 and a second lever arm 37.

The fastening point 32 on the main rotor 4 is situated at a distance D from the axis 16 of the spindle 15 of the rotor blades 12a and 12b of the main rotor 4, whereas the other fastening point 35 on the auxiliary rotor 5 is situated at a distance E from the axis 38 of the oscillatory shaft 30 of the auxiliary rotor 5.

The distance D is preferably larger than the distance E, and about the double of this distance E, and both fastening points 32 and 35 of the rod 31 are situated, seen in the sense of rotation R on the same side of the rotor blades 12a and 12b of the main rotor 4 or of the vanes 28 of the auxiliary rotor 5, in other words they are both situated in front of or at the back of the rotor blades 12a and 12b and vanes 28, seen in the sense of rotation.

The auxiliary rotor 5 is provided with two stabilizing weights 39 which are each fixed to a vane 28 at a distance from the rotor shaft 8.

Further, the helicopter 1 is provided with a receiver, so that it can be controlled from a distance by means of a remote control which is not represented.

As a function of the type of helicopter, it is possible to search for the most appropriate values and relations of the angle between the longitudinal axis 13 of the main rotor 4 and the longitudinal axis 29 of the auxiliary rotor 5 by experiment; the relation between distances D and E; the size of the weights 39 and the relation of the diameters between the main rotor 4 and the auxiliary rotor 5 so as to guarantee a maximum auto stability.

The operation of the improved helicopter 1 according to the disclosure is as follows:

In flight, the rotors 4, 5 and 6 are driven at a certain speed, as a result of which a relative air stream is created in relation to the rotors, as a result of which the main rotor 4 generates an upward force so as to make the helicopter 1 rise or descend or maintain it at a certain height, and the tail rotor 6 develops a laterally directed force which is used to steer the helicopter 1.

It is impossible for the main rotor 4 to adjust it, and it will turn in the plane 14 in which it have been started, usually the horizontal plane. Under the influence of gyroscopic precession, turbulence and other factors, it will take up an arbitrary undesired position if it is not controlled.

The surface of rotation of the auxiliary rotor 5 may take up another inclination in relation to the surface of rotation 14 of the main rotor 8, whereby both rotors 5 and 4 may take up another inclination in relation to the rotor, shaft 8.

This difference in inclination may originate in any internal or external force or disturbance whatsoever.

In a situation whereby the helicopter 1 is hovering stable, on a spot in the air without any disturbing internal or external forces, the auxiliary rotor 5 keeps turning in a plane which is essentially perpendicular to the rotor shaft 8.

If, however, the body 2 is pushed out of balance due to any disturbance whatsoever, and the rotor shaft 8 turns away from its position of equilibrium, the auxiliary rotor 5 does not immediately follow this movement, since the auxiliary rotor 5 can freely move round the oscillatory shaft 30.

The main rotor 4 and the auxiliary rotor 5 are placed in relation to each other in such a manner that a swinging motion of the auxiliary rotor 5 is translated almost immediately in the pitch or angle of incidence A of the rotor blades 12a and 12b being adjusted.

For a two-bladed main rotor 4, this means that the rotor blades 12a and 12b and the vanes 28 of both rotors 4 and 5 must be essentially parallel or, seen in the sense of rotation R, enclose an acute angle with one another of for example 10° in the case of a relatively large main rotor 4 and a relatively smaller auxiliary rotor 5.

This angle can be calculated or determined by experiment for any helicopter 1 or per type of helicopter.

If the axis of rotation or the rotor shaft 8 takes up another inclination than the one which corresponds to the above-mentioned position of equilibrium in a situation whereby the helicopter 1 is hovering, the following happens.

A first effect is that the auxiliary rotor 5 will first try to preserve its absolute inclination, as a result of which the relative inclination of the surface of rotation of the auxiliary rotor 5 in relation to the rotor shaft 8 changes.

As a result, the rod 31 will adjust the angle of incidence A of the rotor blades 12, so that the upward force of the rotor blades 12 will increase on one side of the main rotor 4 and will decrease on the diametrically opposed side of this main rotor.

Since the relative position of the main rotor 4 and the auxiliary rotor 5 are selected such that a relatively immediate effect is obtained. This change in the upward force makes sure that the rotor shaft 8 and the body 2 are led back to equilibrium.

A second effect is that, since the distance between the far ends of the vanes 28 and the plane of rotation 14 of the main rotor 4 is no longer equal and since also the vanes 28 cause an upward force, a larger pressure is created between the main rotor 4 and the auxiliary rotor 5 on one side of the main rotor 4 than on the diametrically opposed side.

A third effect plays a role when the helicopter begins to tilt over to the front, to the back or laterally due to a disturbance. Just as in the case of a pendulum, the helicopter will be inclined to go back to its original situation. This pendulum effect does not generate any destabilizing gyroscopic forces as with the known helicopters that are equipped with a stabilizer bar directed transversally to the rotor blades of the main rotor. It acts to reinforce the first and the second effect.

The effects have different origins but have analogous natures. They reinforce each other so as to automatically correct the position of equilibrium of the helicopter 1 without any intervention of a pilot.

It is clear that the main rotor 4 and the auxiliary rotor 5 must not necessarily be made as a rigid whole. The rotor blades 12a and 12b and the vanes 28 can also be provided on the rotor head 7 such that they are mounted and can rotate relatively separately. In that case, for example, two rods 31 may be applied to connect each time one blade 12 to one vane 28.

It is also clear that, if necessary, the joints and hinge joints may also be realized in other ways than the ones represented, for example by means of torsion-flexible elements.

In the case of a main rotor 4 having more than two blades 12a and 12b, one should preferably be sure that at least one blade 12a and 12b is essentially parallel to one of the vanes 28 of the auxiliary rotor. The joint of the main rotor 4 is preferably made as a ball joint or as a spindle 15 which is directed essentially transversely to the axis of the oscillatory shaft 30 of the auxiliary rotor 5 and which essentially extends in the longitudinal direction of the one blade 12a and 12b concerned which is essentially parallel to the vanes 28.

In another format, the helicopter comprises a body with a tail; a main rotor with blades which is driven by a rotor shaft on which the blades are mounted. A tail rotor is driven by a second rotor shaft directed transversally to the rotor shaft of the main rotor. An auxiliary rotor is driven by the rotor shaft of the main rotor and is provided with vanes from the rotor shaft in the sense of rotation of the main rotor.

The auxiliary rotor is mounted in a swinging relationship on an oscillatory shaft and the swinging motion being relatively upwardly and downwardly about the auxiliary shaft. The auxiliary shaft is provided essentially transverse to the rotor shaft of the main rotor. The main rotor and the auxiliary rotor are connected to each other by a mechanical link, such that the swinging motion of the auxiliary rotor controls the angle of incidence of at least one of the rotor blades of the main rotor. There can be different degrees of width, varying from narrow to broader for each of the rotors, and weights can be strategically placed along the length of the auxiliary rotor to achieve the right motion and effect on the main rotor bearing in mind the appropriate angular relationship between the axis of the auxiliary and the axis of the main rotor to achieve the effect and control of the angle of incidence of the main rotor. In some cases, the auxiliary rotor can be mounted below the main rotor, namely between the top of the body and the main rotor and still achieve the right effect on the main rotor angle of incidence.

The angle of incidence of the rotor in the plane of rotation of the rotor and the rotor shaft may vary. An auxiliary rotor rotatable with the rotor shaft is for relative oscillating movement about the rotor shaft. Different relative positions are such that the auxiliary rotor causes the angle of incidence the main rotor to be different. A linkage between the main and auxiliary rotor causes changes in the position of the auxiliary rotor to translate to changes in the angle of incidence.

The rotor blades of the main rotor and the vanes of the auxiliary rotor respectively are connected to each other with a mechanical linkage that permits the relative movement between the blades of the rotor and the vanes of the auxiliary rotor. A joint of the main rotor to the rotor blades is formed of a spindle which is fixed to the rotor shaft of the main rotor.

The mechanical link includes a rod hinge mounted to a vane of the auxiliary rotor with one fastening point and is hinge-mounted with another fastening point to the blade of the main rotor.

Figure 3:
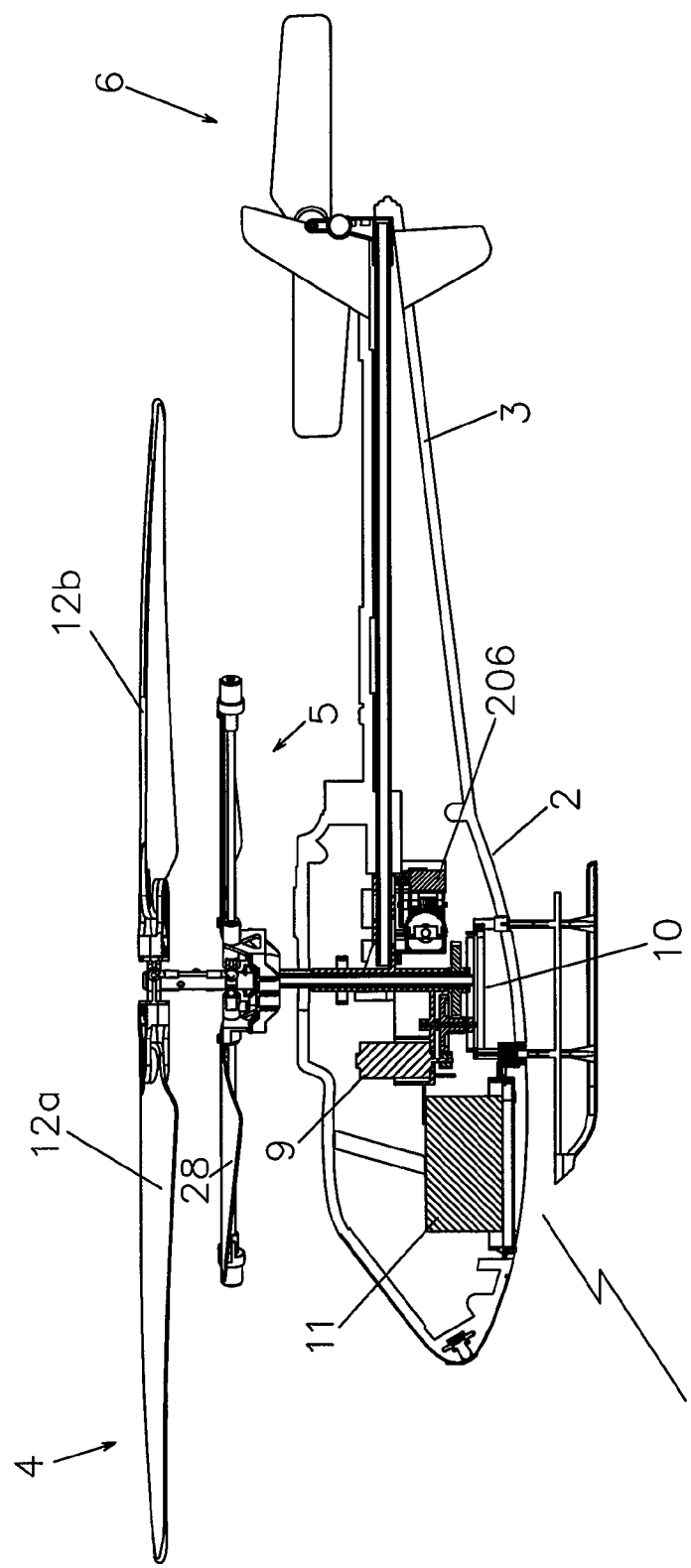
FIG. 3 represents a side cut view of a helicopter.
Figure 4:
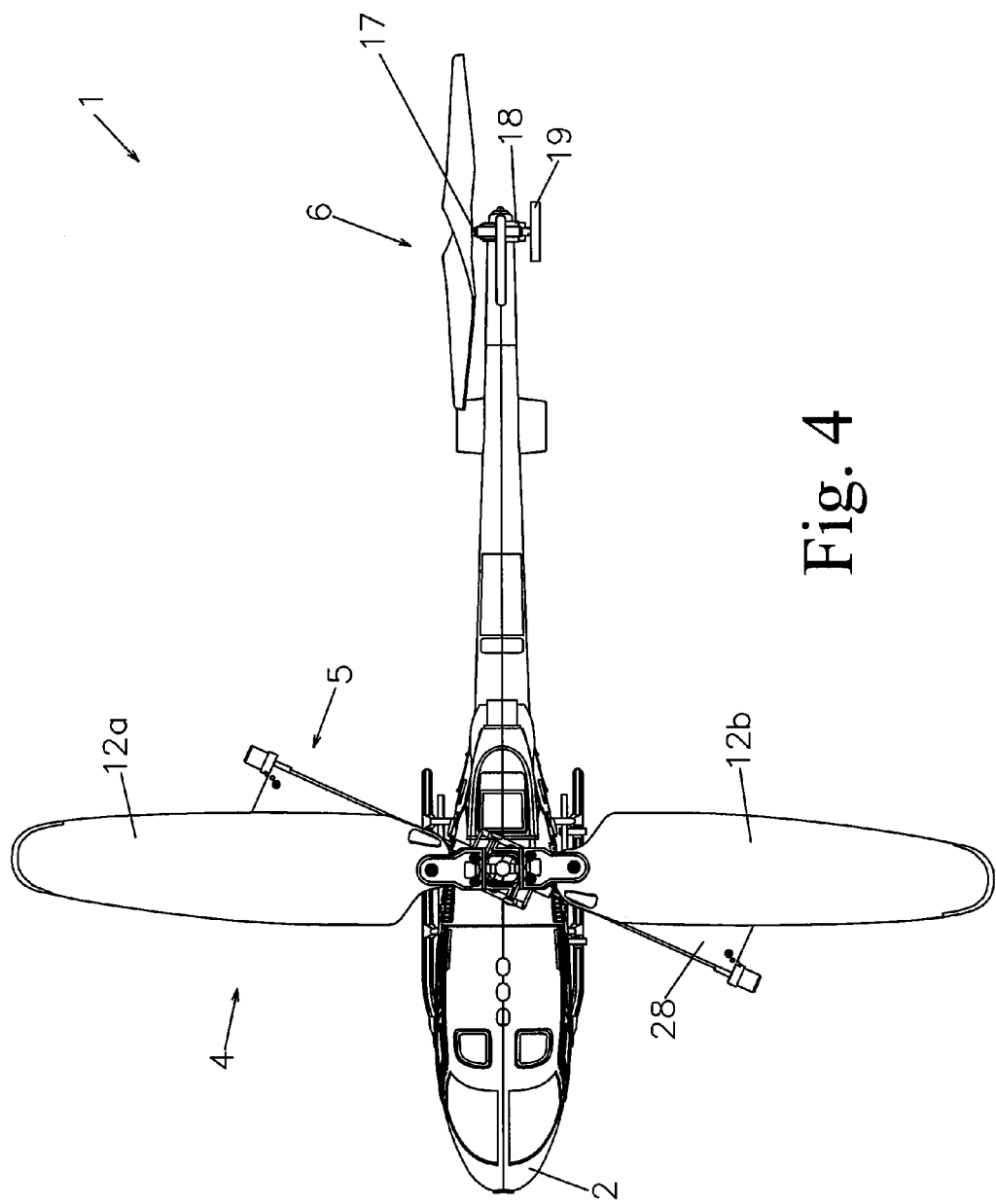
FIG. 4 represents a top view of a helicopter.

There is a downwardly directed stabilizer 108 at the tail of the helicopter. FIG. 3 also shows a radio control unit for operation with the helicopter. This unit can have appropriate computerized controls for signaling the operation of the motors operating the rotors and their relative positions.

Figure 5:
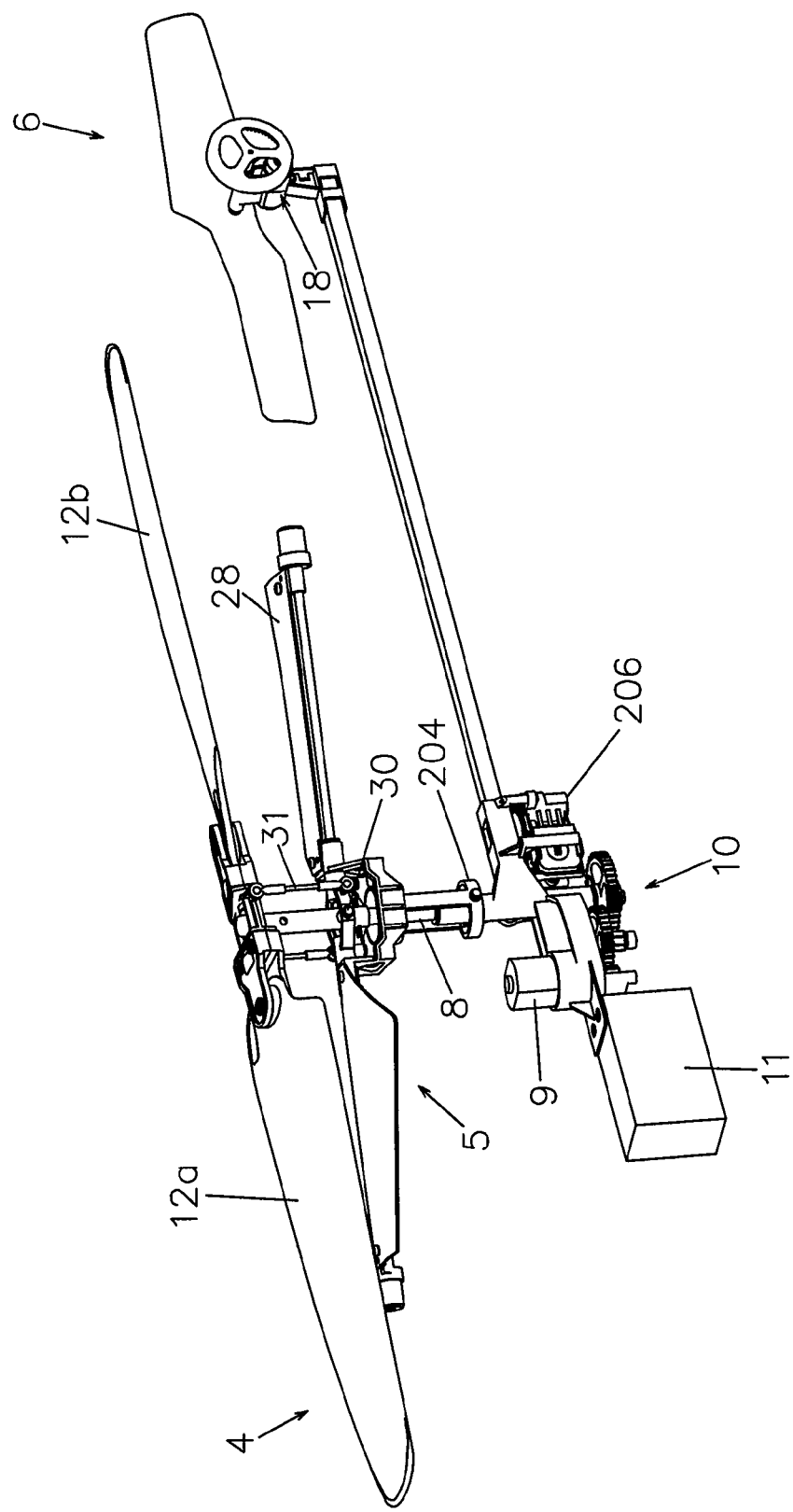
FIG. 5 represents a perspective view of the rotor assembly of a helicopter.

The rotor 4 and the stabilizer rotor or auxiliary rotor 5 are interconnected in FIG. 5. The rotor 4 and also the stabilizer rotor or auxiliary rotor 5 are independent to move around hinging lines as found in helicopter rotors. This can, for example, be a feather or a teeter hinge or axis 113 and 202 respectively. The helicopter as represented is able to move up or down by changing rotor rpm, or change heading by altering tail rotor rpm.

Figure 7:
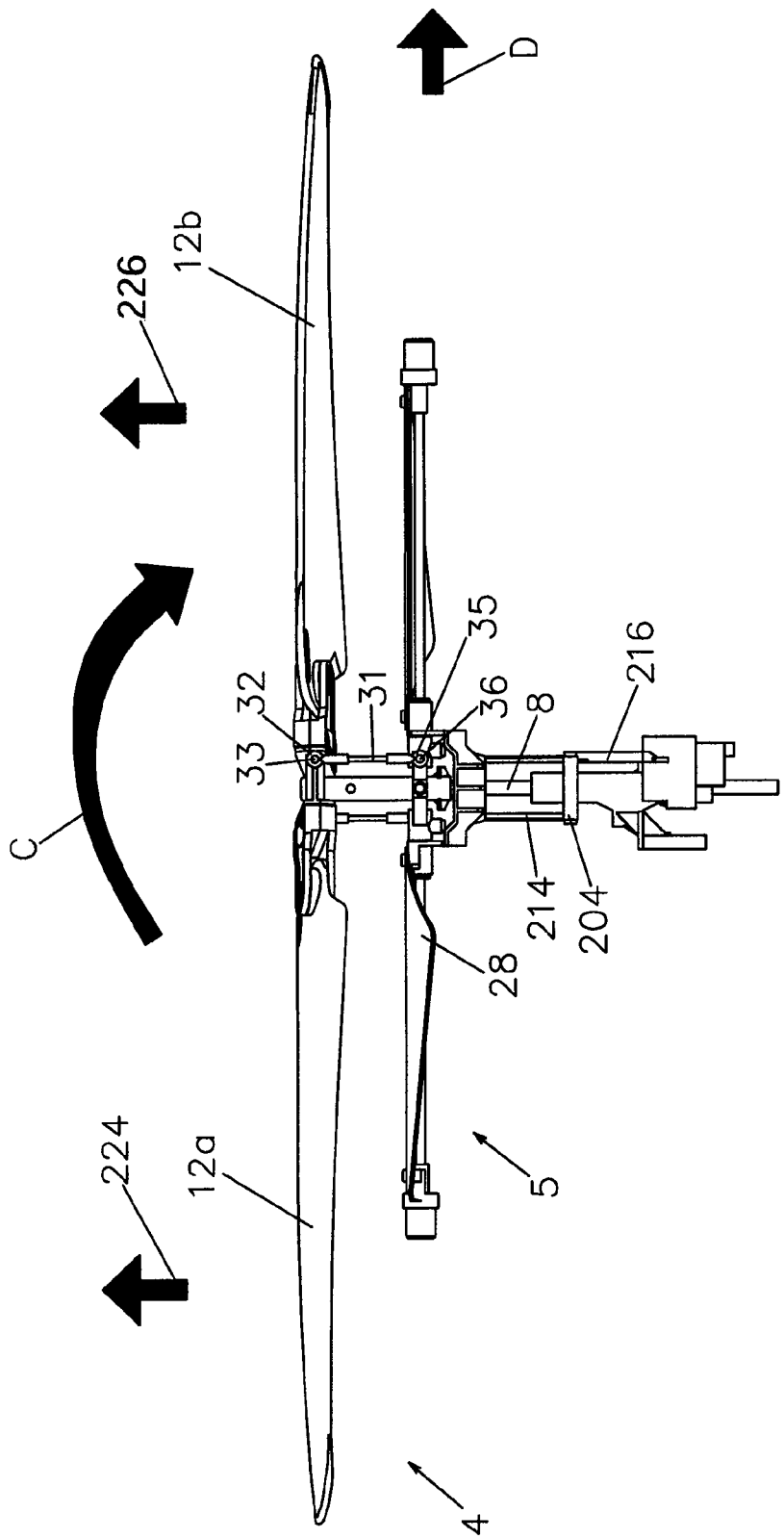
FIG. 7 is a front view of a rotor assembly.

In order to more effectively control a helicopter in flight, preferably essentially permanent commands are needed in those horizontal dimensions to direct the helicopter in or towards the desired direction. There is provided a control system to influence the lift force of the rotor 4 in a cyclical way, i.e., in such a way that each rotor blade 12a and 12b varies lift along one rotation around the vertical rotor shaft 8. When the rotor halves 12a and 12b produce different lift 224 for blade 12a versus the other lift 226 for blade 12b, a torque C originates and moves the rotor 4 in the direction D of that torque. The effect of this torque is not necessarily in line with the span of the rotor and may occur later due to gyroscopic forces. The angle of incidence on the one blade 12a related to the plane of rotation is steeper or larger than the angle of incidence of the blade 12b or portion related to the plane of rotation which is relatively shallower. This effects a movement in Direction D. This can be influenced by gyroscopic forces. This is illustrated in FIG. 7. Each blade 12a and 12b connected to the rotor assembly sees this change cyclically along a 360-degree rotation of the rotor shaft.

The control system of the disclosure includes the following features:
- a rotor 4, preferably but not essentially complemented with a stabilizer rotor 5,
- a ring 204, attached to the rotor 4, and
- an actuator device 206, connected with the helicopter body structure represented by a base element 208 illustrated in a representative manner in FIGS. 3 and 5.

Figure 17:
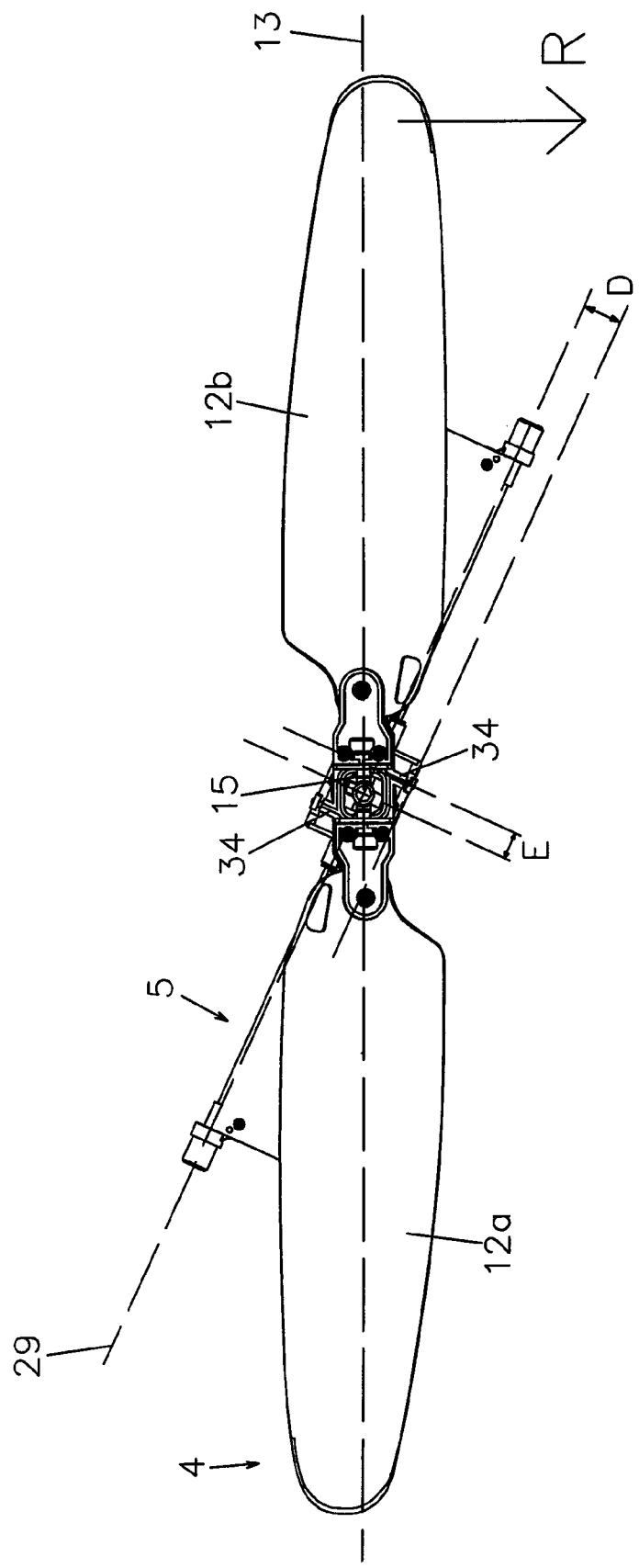
FIG. 17 is a top view of a rotor assembly.

The ring 204 is generally centered around the rotor shaft 8. The ring 204 moves with the rotor 4 when tilted around the longitudinal axis 13 or feather axis. This is illustrated in some detail in FIG. 17, such that the tilt is shown in FIGS. 12 and 13.

The actuator device 206 could have many forms, and use different technologies. It could be an electric motor for example with a lever attached to the axis of the motor, a servo or other electromagnetic or magnetic systems can be used. Other systems can be used. There could be a piezoelastic device, ionic polymer actuators, other non-magnetic devices and other interactive and/or inter-responsive systems for causing a lever to move, or if there is no lever there could be a different configuration for having the rotor move about an axis such as the feather axis in a periodic manner.

Operation: No Command State

In the situation where the actuator 206 is not activated, there is contact between the depending actuator arm 216 and the ring 204, no matter the rotation position of the rotor 4. In the case of a self-stabilizing rotor system, the helicopter will float more or less in a hovering position, depending mainly on the position of the center of gravity, as explained in the prior patent applications referred to above and also disclosed in this disclosure.

Operation: Command State

When the actuator 206 is activated, then the movable actuator arm 216 moves, and engages the ring 204 and exercises a force on the ring 204. The size of that force depends on the size of the control signals sent by the actuator 206. The force causes a torque on the ring 204.

This torque inclines the attached rotor 4 along the feather axis 200, which is perpendicular to the force the actuator exerts. For example, one rotor half or one blade 12a takes a higher angle of incidence, while the opposing rotor half or blade 12b takes a lower angle of incidence. The lift force 224 generated by rotor half or blade 12a are bigger than the lift force 226 generated by rotor half or blade 12b.

Figure 6:
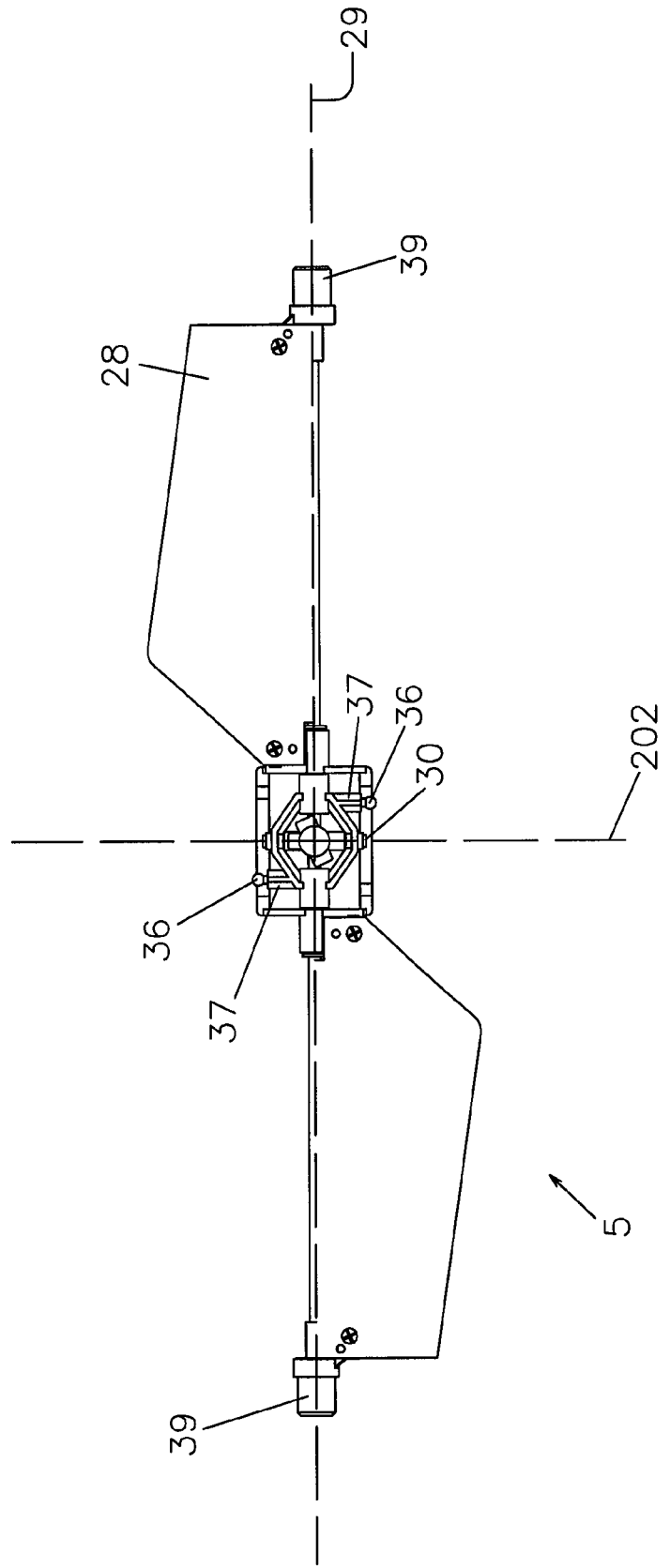
FIG. 6 is a top view of an auxiliary rotor.

The stabilizer or auxiliary rotor 5 follows the movement of the attached rotor 4 depending on its mechanical relationship with that rotor 4. In case of the helicopter of FIGS. 1 to 21, the stabilizer or auxiliary rotor 4 hinges around the teeter axis 202. FIG. 6 is illustrative.

This asymmetry in lift force exercises a torque on the helicopter as further explained in relation to FIG. 7.

When the rotor 4 progresses in its rotation by 90 degrees, the longitudinal axis 13 or feather axis of the rotor 4 and ring 204 is now in line with the force of the actuator 206 and its depending actuator arm 216. The rotor 4 cannot incline as a result of the exercised force, and the rotor 4 does not 'see' this force or torque. This is a mechanical explanation of how the control is relatively cyclical. The ring 204 is not tilted in this portion of the cycle and has zero effect.

This means that the impact from the force of the actuator 206 goes from maximum to zero in a 90-degree progression of the rotor. It goes to maximum again for the next progression of 90 degrees, and again to zero for the next 90 degrees, etc. This can be essentially a sinusoidal type change of force acting on the blade or blades of the rotor.

This causes the effect of the force to vary cyclically. This is a term generally used in helicopters to indicate that the impact of the control input varies not only with the size and type of control input, but as well with the position of the blade progressing along a 360 circle around the rotor shaft 8. With the position of the actuator 206 with respect to the rotor shaft 8 and the body fixed, the effect of the force of the actuator 206 makes the helicopter go in essentially or substantially the same or similar direction. This is determined by the angle of the actuator 206 position relative to the body and the rotor shaft 8 and the gyroscopic effects the size of the force mostly impacts the speed and/or acceleration of the movement of the body. This is a control system to control the movement of the helicopter body 2.

Operation: Variations and Parameters

When the actuator position is in line with the axis of the helicopter body from nose to tail, it does not mean the helicopter moves forward with a control input. Gyroscopic forces tend to delay the effects of moving the position of spinning masses by up to 90 degrees. The exact delay depends on parameters like the masses of the spinning objects, such as for instance the rotor, and/or stabilizer, and the aerodynamic forces, the angle between the rotor feather axis and the rotor centerline, the type of rotor hinges ('rigid' or 'soft') etc. The preferred positioning of the actuator for the desired effect is effectively determined, as a function of the desired direction of movement.

Two actuators can be used to exercise force independently of each other on the control ring. As such, and in case these actuators are disposed 90 degrees one versus the other and commanded by two independent signals, two-dimensional horizontal movement can be initiated. When four actuators are installed, one every 90 degrees relative to each other, a fuller directional control in the horizontal plane is possible.

When, for instance, three actuators are used, each 120 degrees from the other and commanded by 3 independent signals, and provided some interrelation of the 3 signals, a fuller directional control in the horizontal plane is possible.

Operation Specifics

The helicopters of the prior related patent applications create auto-stability. One of the elements of the system is a completely free to move rotor/stabilizer assembly. Any external obstruction to this causes the stabilizing effect to disappear. In a 'classic' cyclical control system, the control mechanism takes full control over the rotor system. The degree to which the control system overrides the stability system may not be 100%. Tuning and calibration however can keep stability. This is a lower effect, when given a movement command on the actuator 206.

With the actuator based control system, there are disclosed different features and capabilities.

When a signal is passed to the actuator 206, the force temporarily interferes with the rotor system, 'destabilizing' it in such a way that the helicopter moves in the desired direction.

When the actuator signal is put back to zero, then the rotor assembly is free again to take over control.

There is a control system for regulating the degree of requisite horizontal movement and a control system for regulating the stability of the helicopter in a relative non-horizontal moving sense. The degree to which the horizontal movement control system is dominant over the non-horizontal movement stability system of the helicopter determines the rate of change in position in the horizontal sense. The horizontal control system includes the interaction of the ring 204, actuator 206 and its control operation. The control system for stability is achieved in part by the interactive rotor 4 and stabilizing rotor 5.

In the case represented, when the rotor 4 and stabilizer or auxiliary rotor 5 find themselves in an 'unnatural state'—they realign themselves automatically for all the reasons claimed by prior helicopter and come back to a state of equilibrium. This means that there is accomplished the combination of both desired components: stability when no input is given, and control when input signal is given to the actuator 206 and the ring 204.

The present disclosure is not limited to the embodiments described as an example and represented in the accompanying figures. Many different variations in size and scope and features are possible. The disclosure has been described and illustrated with a self-stabilizing rotor system. Other non-self stabilizing flying devices could also use the control system of the disclosure. For instance, instead of electrical motors being provided others forms of motorized power are possible. A different number of blades may be provided to the rotors.

A helicopter according to the disclosure can be made in all sorts of shapes and dimensions while still remaining within the scope of the disclosure. In this sense although the helicopter in some senses has been described as toy or model helicopter, the features described and illustrated can have use in part or whole in a full-scale helicopter. In some cases the helicopter may be a structure without a tail rotor. Different helicopter—type systems can use the control of the disclosure. In other cases the rotor control can be used with different flying objects.

In other forms instead of the mechanical interaction to effect the control a suitable magnetic or electro magnetic servo can be used for instance with a helicopter using the main rotor and also a stabilizer auxiliary rotor.

Although the disclosure has detailed a system for essentially substantial or approximate horizontal movement in one or two directions, the disclosure includes systems for permitting control of the movement in other substantially horizontal directions. As such, the helicopter control can affect control of horizontal movement forward and/or backwards and/or sideways to the left and/or sideways to the right or different combinations of those movements.

For this purpose there may be more than the one control system for inter-reacting with the rotor assembly. There could be several control systems operating on the rotor in parallel and/or series manner to effect the desired horizontal movement.

The horizontal movements effected by the control systems are in addition to the up and/or down movements which are possible with the helicopter system with the control being non-operation or on-function on the rotor assembly.

Instead of an assembly depending from the rotor there could be other structures for the actuator to interact with the rotor system. Further, instead of a ring for interaction with the actuator there could be other physical structures for interaction with the actuator. In different cases there can be more than two blades for the rotor, and one or two or more of the blades of the rotor can be controlled to different or the same degree.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A remote control toy helicopter comprising:
   a body;
   a motor and a battery for the motor, the motor being controllable by a controller remote from the helicopter body;
   a main rotor with propeller blades which is driven by a rotor shaft on which the blades are mounted, and a joint of the main rotor being a spindle which is fixed to the rotor shaft of the main rotor;
   an auxiliary rotor driven by the rotor shaft of the main rotor for rotation in the sense of rotation of the main rotor;
   a second rotor which is driven by a second rotor shaft;
   the auxiliary rotor being provided with two vanes extending essentially in a line with their longitudinal axis, the auxiliary rotor being mounted in a swinging relationship on an oscillatory shaft which is provided essentially transversally to the rotor shaft of the main rotor and being directed essentially transversally to the longitudinal axis of the vanes;
   the main rotor and the auxiliary rotor being connected to each other by a mechanical link, such that the swinging motion of the auxiliary rotor controls the angle of incidence of at least one of the rotor blades of the main rotor; and
   an actuator for engaging with a control assembly depending from the auxiliary rotor, wherein the actuator includes at least a portion of a cam outer engaging surface, the cam being mounted about the rotor shaft, and an actuator arm being engagable with the cam, the actuator arm being movable between different positions thereby to move the cam into different relative positions about the rotor shaft, such that the control assembly of the auxiliary rotor engages the cam in different positions of engagement, an inter-engagement of the cam and a first element of the control assembly effecting a change in the angle of incidence of at least one vane of the auxiliary rotor, the first element engaging through an interface with the cam, at least one of the first element or cam has a curved face interface, and the first element and cam being for sliding engagement, the action of the cam being for movement between non-tilted and tilted positions relative to the rotor shaft and the first element, wherein the cam retains contact with the first element, and the first element contacts different portions of the cam for different positions of relative tilt of the cam.

2. A helicopter of claim 1 including multiple actuators, the multiple actuators being spaced circumferentially around the rotor shaft thereby to interact with the control assembly at different circumferential positions relative to the rotor shaft, the interaction occurring when selected actuators are aligned with a selected location of the control assembly.

3. A helicopter of claim 1 wherein the actuator arm is movable between a position of repose and a position of inter-engagement with the control assembly and wherein the degree of movement of and the force exercised by the actuator arm effects the degree of interaction with the control assembly and the degree of change of angle of inclination of the at least one blade.

4. A helicopter of claim 1 wherein the control assembly includes a flange located about and rotatable with the rotor shaft, and wherein the actuator is located to be non rotatable relative to the body.

5. A helicopter of claim 1 wherein the auxiliary rotor is located relatively below the main rotor and the auxiliary rotor is effectively mechanical coupled with the actuator located on the body whereby the actuator is for effecting changes to the incidence angle of the vanes, and the auxiliary rotor is hinge connected with the main rotor.

6. A helicopter of claim 1 wherein the auxiliary rotor includes vanes mounted relatively to the rotor shaft such that the angle of incidence of the vanes are variable along a tip to tip axis of the vanes.

7. A helicopter of claim 1 wherein the auxiliary rotor includes flanges, the flanges being for interaction with an element of the control assembly thereby to change the vanes incidence angle.

8. A helicopter of claim 1 wherein the main rotor defines a plane for rotation, and the rotor includes components, the components being relatively movable to each other, the relative motion being possible in the plane of rotation.

9. A helicopter of claim 1 wherein the rotor blade includes portions mounted to permit swiveling about an axis, the axis being located transverse the plane for rotation.

10. A helicopter of claim 1 wherein the main rotor blades and auxiliary rotor vanes each respectively have a longitudinal axis extending essentially from tip to tip of the respective rotors, and wherein the respective longitudinal axes are located at an acute angle less than about 45 degrees in the sense of rotation relative to each other, and wherein the auxiliary rotor is rotatable tip to tip in a direction transverse to the sense of rotation and wherein the auxiliary rotor is mounted below the main rotor.

11. A remote control toy helicopter comprising:
a body;
a motor and a battery for the motor, the motor being controllable by a controller remote from the helicopter body;
a main rotor with propeller blades which is driven by a rotor shaft on which the blades are mounted, and a joint of the main rotor being a spindle which is fixed to the rotor shaft of the main rotor;
an auxiliary rotor driven by the rotor shaft of the main rotor for rotation in the sense of rotation of the main rotor;
a tail rotor which is driven by a second rotor shaft directed transversally to the rotor shaft of the main rotor;
the auxiliary rotor being provided with two elongated rotor elements extending essentially in a line with their longitudinal axis, the auxiliary rotor being mounted in a swinging relationship on an oscillatory shaft which is provided essentially transversally to the rotor shaft of the main rotor and being directed essentially transversally to the longitudinal axis of the vanes; two elongated rotor elements extending essentially in a line with their longitudinal axis in the sense of rotation of the main rotor is essentially parallel to the longitudinal axis of at least one of the rotor blades of the main rotor or is at a relatively small acute angle relative to the axis;
the main rotor and the auxiliary rotor being connected to each other by a mechanical link, such that the swinging motion of the auxiliary rotor controls the angle of incidence of at least one of the rotor blades of the main rotor;
an actuator for engaging with a control assembly depending from the auxiliary rotor, wherein the actuator includes at least a portion of a cam outer engaging surface, the cam being mounted about the rotor shaft, and an actuator arm being engagable with the cam, the actuator arm being movable between different positions thereby to move the cam into different relative positions about the rotor shaft, such that the control assembly of the auxiliary rotor engages the cam in different positions of engagement, an inter-engagement of the cam and a first element of the control assembly effecting a change in the angle of incidence of at least one vane of the auxiliary rotor, the first element engaging through an interface with the cam, at least one of the first element or cam has a curved face interface, and the first element and cam being for sliding engagement, the action of the cam being for movement between non-tilted and tilted positions relative to the rotor shaft and the first element, wherein the cam retains contact with the first element, and the first element contacts different portions of the cam for different positions of relative tilt of the cam; and
wherein the longitudinal axis of the elongated rotor elements of the auxiliary rotor in the sense of rotation is located within an angle of about 45 to 15 degrees, and preferably about 25 degrees with the longitudinal axis of one of the rotor blades of the main rotor and wherein the auxiliary rotor is located relatively below the main rotor.

12. A helicopter according to claim 11, wherein the main rotor includes two blades situated essentially in line with each other.

13. A helicopter according to claim 11, wherein the rotor blades of the main rotor, the vanes of the auxiliary rotor respectively, are connected to each other through a mechanical linkage including a rod coupling and hinge joints, the joints with the main rotor and the auxiliary rotor being located relatively transversally to the rotor shaft and spaced from the rotor shaft, the coupling being relatively parallel to the rotor shaft, and being spaced from the rotor shaft, and the spindle of the main rotor being directed essentially parallel to the longitudinal axis of the main rotor.

14. A helicopter according to claim 11 wherein the rod hinge is mounted to a vane of the auxiliary rotor with one fastening point and is hinge-mounted with another fastening point to the rotor blade of the main rotor which is parallel to one of the vanes or is at an acute angle relative to the blade.

15. A helicopter according to claim 11 wherein the tail rotor is supported by a swing with its rotor shaft which can rotate round a swinging shaft which essentially extends according to the longitudinal direction of the body of the helicopter.

16. A remote control toy helicopter comprising:
a body;
a motor and a battery for the motor, the motor being controllable by a controller remote from the helicopter body;
a main rotor with propeller blades which is driven by a rotor shaft on which the blades are mounted;
an auxiliary rotor driven by the rotor shaft of the main rotor for rotation in the sense of rotation of the main rotor;
a second rotor which is driven by a second rotor shaft; and
the auxiliary rotor being driven by the rotor shaft of the main rotor and being provided with two vanes extending essentially in a line with their longitudinal, the auxiliary rotor being mounted in a swinging relationship on an oscillatory shaft which is provided essentially transversally to the rotor shaft of the main rotor and being directed essentially transversally to the longitudinal axis of the vanes, and the main rotor and the auxiliary rotor are connected to each other by a mechanical link, such that the swinging motion of the auxiliary rotor controls the angle of incidence of at least one of the rotor blades of the main rotor, and a control for moving the angle of incidence of at least one blade of the rotor cyclically along at least part of a 360 degree rotation path around a rotor shaft, causing a variation in lift force of the blade along the rotations path such that the swinging motion of the auxiliary rotor controls the angle of incidence of at least one of the propeller blades of the main rotor, and a joint of the main rotor to the propeller blade formed of a spindle which is fixed to the rotor shaft of the main rotor, such that the angle between the plane of rotation of the auxiliary rotor and the rotor shaft may vary;
an actuator for moving the angle of incidence of at least one vane of the auxiliary rotor relative to the angle of incidence of a blade of the main rotor cyclically along at least part of a 360 degree rotation path around the rotor shaft, and wherein a length of an actuator arm relative to a length of a control assembly from a location of anchoring the rotor to the shaft effects the degree of interaction with the control assembly and the degree of change of angle of inclination of the at least one vane;
the actuator for engaging with the control assembly depending from the auxiliary rotor, wherein the actuator includes at least a portion of a cam outer engaging surface, the cam being mounted about the rotor shaft, and the actuator arm being engagable with the cam, the actuator arm being movable between different positions thereby to move the cam into different relative positions about the rotor shaft, such that the control assembly of the auxiliary rotor engages the cam in different positions of engagement, an inter-engagement of the cam and a first element of the control assembly effecting a change in the angle of incidence of at least one vane of the auxiliary rotor, the first element engaging through an interface with the cam, at least one of the first element or cam has a curved face interface, and the first element and cam being for sliding engagement, the action of the cam being for movement between non-tilted and tilted positions relative to the rotor shaft and the first element, wherein the cam retains contact with the first element, and the first element contacts different portions of the cam for different positions of relative tilt of the cam; and wherein the longitudinal axis of the vanes of the auxiliary rotor in the sense of rotation is located within an angle of about 45 to 15 degrees, and preferably about 25 degrees with a longitudinal axis of the propeller blades of the main rotor.

17. A rotor assembly for a remote control toy helicopter, comprising:

a motor and a battery for the motor, the motor being controllable by a controller remote from the helicopter body;

a main rotor having two propeller blades mounted on a rotor shaft for rotation with the rotor shaft;

an auxiliary rotor mounted on the rotor shaft for rotation in the sense of rotation of the main rotor, the auxiliary rotor being mounted in a swinging relationship on an oscillatory shaft provided essentially transverse to the rotor shaft of the main rotor and the swinging motion being relatively upwardly and downwardly about the oscillatory shaft;

the main rotor and the auxiliary rotor having planes of rotation spaced from each other and being linked with each other by a mechanical linkage, such that the swinging motion of the auxiliary rotor controls an angle of incidence of the propeller blades of the main rotor;

wherein at least one propeller blade of the main rotor is for pivotably mounting on a spindle which is fixed on the rotor shaft;

an actuator for moving the angle of incidence of at least one elongated rotor element of the auxiliary rotor cyclically along at least part of a 360 degree rotation path around the rotor shaft, such that the angle between the plane of rotation of the at least one elongated rotor element of the auxiliary rotor and the rotor shaft may vary;

the actuator for engaging with a control assembly depending from the auxiliary rotor, wherein the actuator includes at least a portion of a cam outer engaging surface, the cam being mounted about the rotor shaft, and an actuator arm being engagable with the cam, the actuator arm being movable between different positions thereby to move the cam into different relative positions about the rotor shaft, such that the control assembly of the auxiliary rotor engages the cam in different positions of engagement, an inter-engagement of the cam and a first element of the control assembly effecting a change in the angle of incidence of at least one vane of the auxiliary rotor, the first element engaging through an interface with the cam, at least one of the first element or cam has a curved face interface, and the first element, and cam being for sliding engagement, the action of the cam being for movement between non-tilted and tilted positions relative to the rotor shaft and the first element, wherein the cam retains contact with the first element, and the first element contacts different portions of the cam for different positions of relative tilt of the cam; and wherein the auxiliary rotor includes flanges, the flanges being for interaction with an element of the control assembly thereby to change the elongated rotor element incidence angle.

18. A rotor assembly according to claim 17, wherein the auxiliary rotor is located relatively below the main rotor, and the auxiliary rotor is effectively mechanical coupled with the actuator located on the body whereby the actuator is for effecting changes to the incidence angle of the elongated rotor element, and the auxiliary rotor is hinge connected with the main rotor.

19. A rotor assembly according to claim 17, wherein a longitudinal axis of the elongated rotor element of the auxiliary rotor in the sense of rotation is located within an angle of about 45 to 15 degrees, and preferably about 25 degrees with a longitudinal axis of the propeller blades of the main rotor.

20. A rotor assembly according to claim 17, wherein the main rotor defines a plane for rotation and the rotor includes components, the components being relatively movable to each other, the relative motion being possible in the plane of rotation.

21. A helicopter of claim 1 wherein the cam has the curved face and the first element has a relatively straight follower flange for engaging the curved face.

22. A helicopter of claim 1 wherein the cam has a donut shape and the curved face is an outer periphery of the donut, and the first element has a relatively straight follower flange for engaging the curved face.

23. A helicopter of claim 22 wherein the donut shape included a flat top and a flat bottom between the curved face on the outer periphery of the donut.

24. A helicopter of claim 1 wherein the cam has the curved face formed as the periphery of a ring, and the control assembly includes a pair of oppositely spaced elements, the spacing between the pair of elements being substantially equal to the diameter of the ring and being for engaging the curved face.

25. A helicopter of claim 24 wherein the cam has a donut shape and the curved face is an outer periphery of the donut, and the first element has a relatively straight follower flange for engaging the curved face.

26. A helicopter of claim 25 wherein the donut shape included a flat top and a flat bottom between the curved face on the outer periphery of the donut.

27. A helicopter of claim 1 including a servo attached to the body, and wherein the actuator is moved through the servo.

28. A helicopter of claim 22 including a servo attached to the body, and wherein the actuator is moved through the servo.

29. A helicopter of claim 1 wherein the curved face interface is in the general parallel direction relative to the rotor shaft when the actuator cam is in a relatively no-tilt position relative to the shaft.

30. A helicopter of claim 1 wherein the curved face interface extends circumferentially about the rotor shaft at a relatively equal radial distance in relation to the rotor shaft when the actuator is in a relatively no-tilt position relative to the shaft.

31. A helicopter of claim 1 wherein the sliding engagement is one wherein the element and actuator interface are not fixedly connected with each other at the interface.

32. A helicopter of claim 1 wherein the element and cam are separable from each other at the interface.

33. A helicopter of claim 1 wherein the cam has a shape with the curved face formed as an outer periphery of the cam, the first element having a relatively straight follower flange for engaging the curved face.

34. A helicopter of claim 33 wherein the outer periphery curved face considered from the side is a partial circle, and wherein the distance between the engaging element flange and the and the tangent point of the curve and the element flange at the interface is substantially the same for different positions of inclination of the actuator relative to the rotor shaft.

35. A helicopter of claim 33 wherein the shape includes a flat top and a flat bottom between the curved face on the outer periphery.

* * * * *